Figure 1:
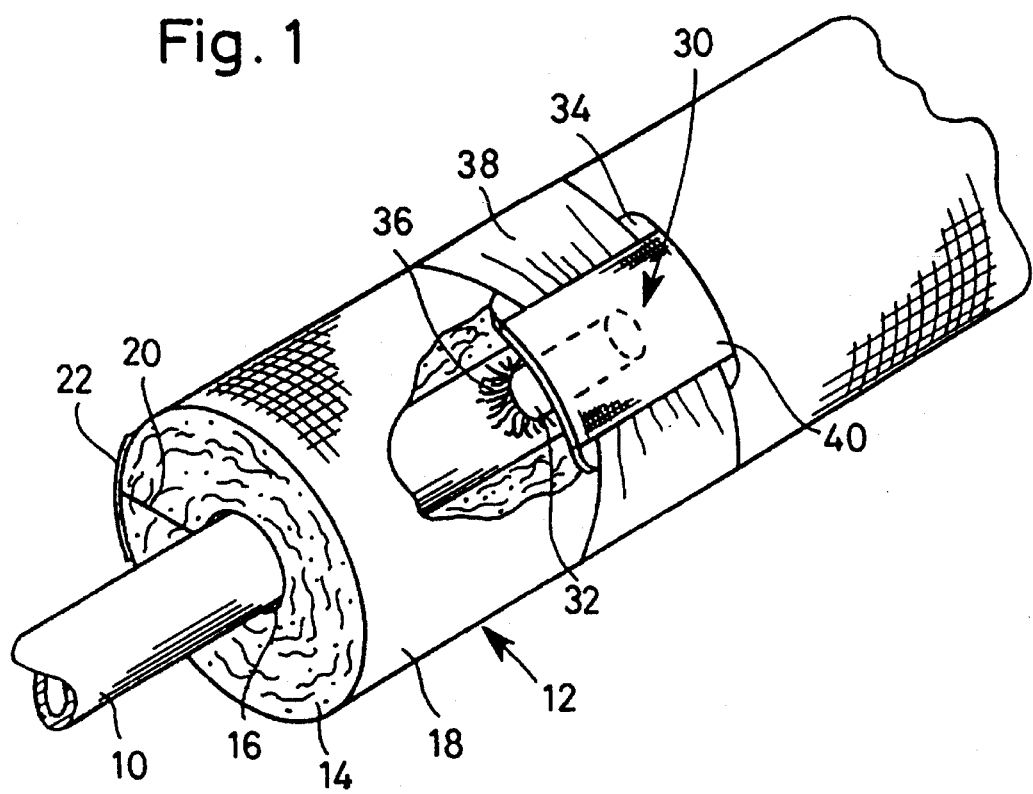

United States Patent [19]
Jepsen et al.

[11] Patent Number: 5,520,009
[45] Date of Patent: May 28, 1996

[54] METHOD AND APPARATUS FOR INSULATING

[75] Inventors: Keld Jepsen, Slangerup; Ian Cridland, Vanloese; Jorgen S. Petersen, Roskilde, all of Denmark; A. M. Ettema, Herten, Netherlands

[73] Assignee: Rockwool International A/S, Hedehusene, Denmark

[21] Appl. No.: 182,634

[22] Filed: Jan. 14, 1994

[30] Foreign Application Priority Data

| Aug. 31, 1992 | [DK] | Denmark | 1082/92 |
| Nov. 24, 1992 | [DK] | Denmark | 1413/92 |
| Aug. 27, 1993 | [WO] | WIPO | 93/00281 |

[51] Int. Cl.⁶ ............................................. F16L 59/14
[52] U.S. Cl. .................. 62/272; 62/281; 62/285; 62/273
[58] Field of Search ............... 62/272, 273, 281, 62/285, 290; 165/913

[56] References Cited

U.S. PATENT DOCUMENTS

| 3,989,104 | 11/1976 | Newton | 165/111 |
| 4,664,182 | 5/1987 | Miwa | 165/133 |
| 4,745,760 | 5/1988 | Porter | 62/55 |

FOREIGN PATENT DOCUMENTS

| 87317 | 5/1959 | Denmark . |
| 152303 | 2/1988 | Denmark . |
| 152931 | 5/1988 | Denmark . |
| 153417 | 7/1988 | Denmark . |
| 181327 | 4/1936 | Germany . |
| 123644 | 12/1948 | Sweden . |
| 89/12199 | 12/1989 | WIPO . |
| 91/18237 | 11/1991 | WIPO . |

OTHER PUBLICATIONS

*Wetting of outdoor pipe conduits of mineral wool of results in large losses of energy;* Paulsrud, Kaefer Isoleringsteknikk A/S; pp. 5-6 (English translation included).

Primary Examiner—Henry A. Bennett
Assistant Examiner—William C. Doerrler
Attorney, Agent, or Firm—Merchant, Gould, Smith, Edell, Welter & Schmidt

[57] ABSTRACT

For removing water condensed on the outer surface of a tube (10) which is insulated by means of an insulating assembly (12), a plug (30) is arranged extending through the insulating assembly. The plug comprises a conduit component (32) in which a capillary suction material (36) is enclosed. The material (36) communicates with an evaporator foil (38) circumferentially encircling the outer cylindrical surface of the insulating assembly (12). The capillary suction material (36) may be substituted by a foil of a capillary suction material or a hygroscopic paint.

73 Claims, 16 Drawing Sheets

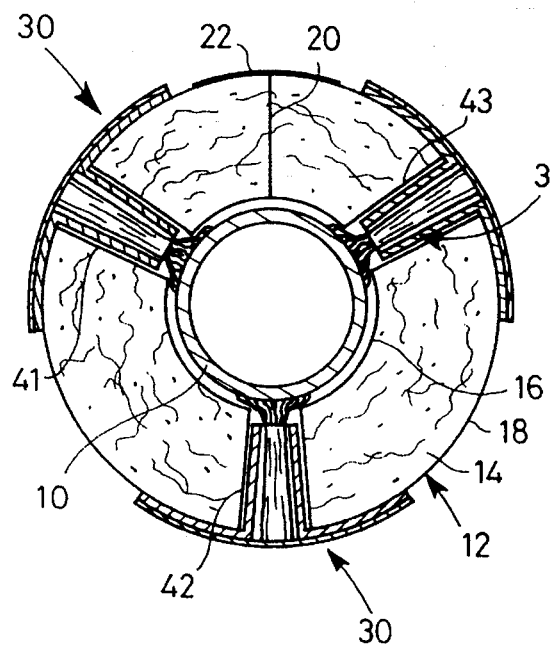
Fig. 5
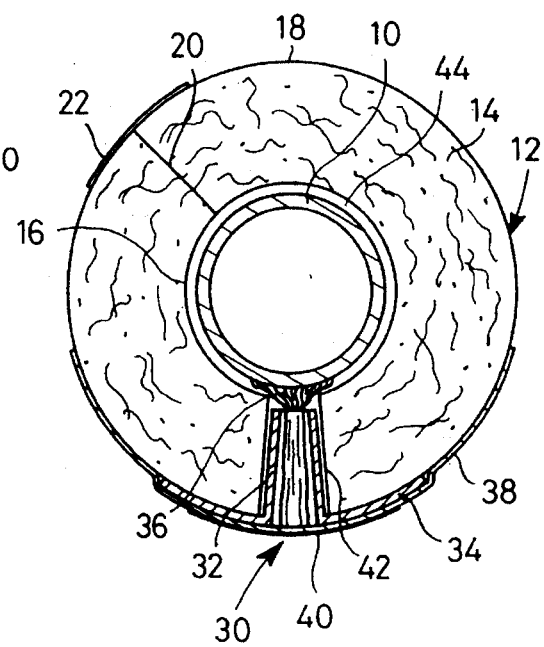
Fig. 6
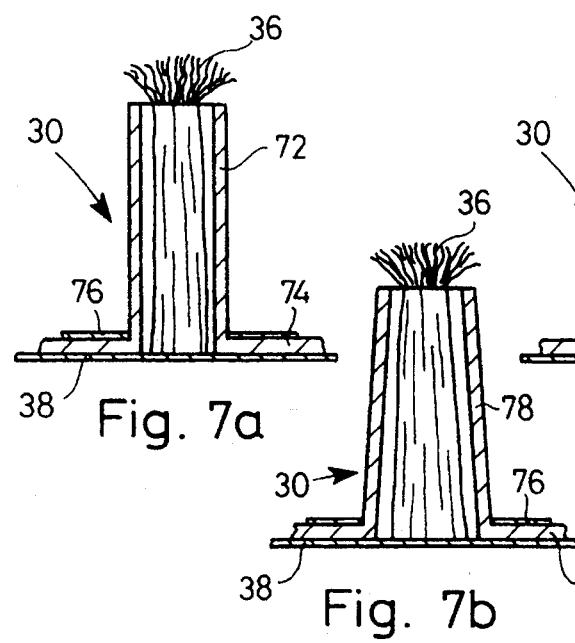
Fig. 7a
Fig. 7b
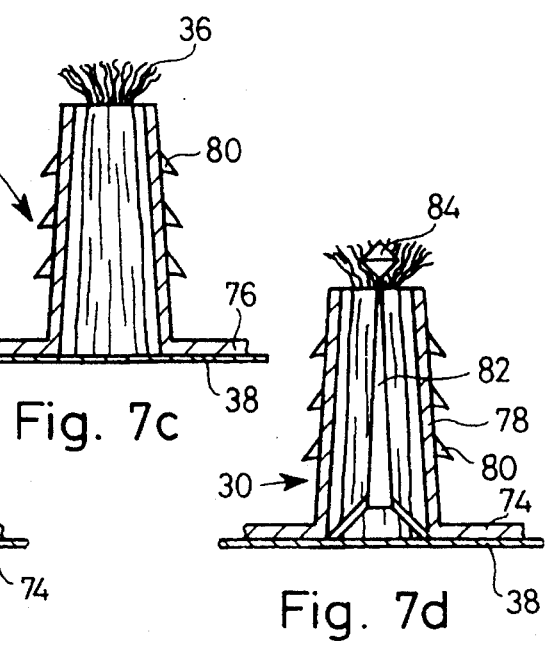
Fig. 7c
Fig. 7d Fig. 8
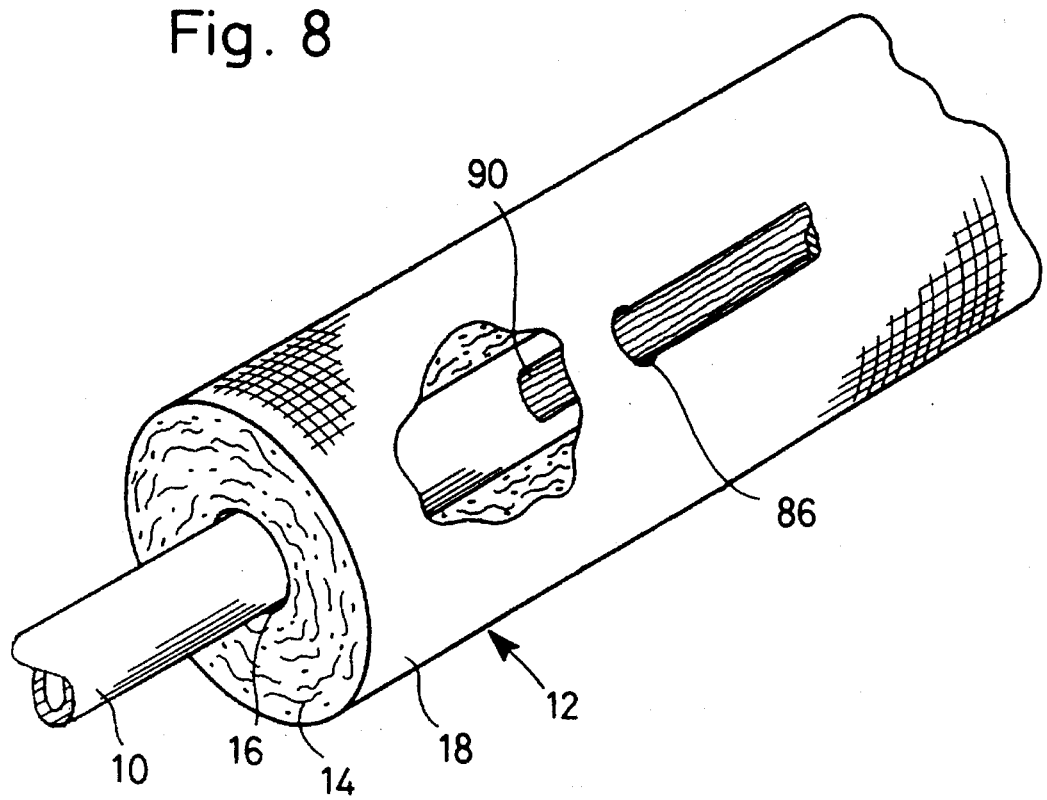
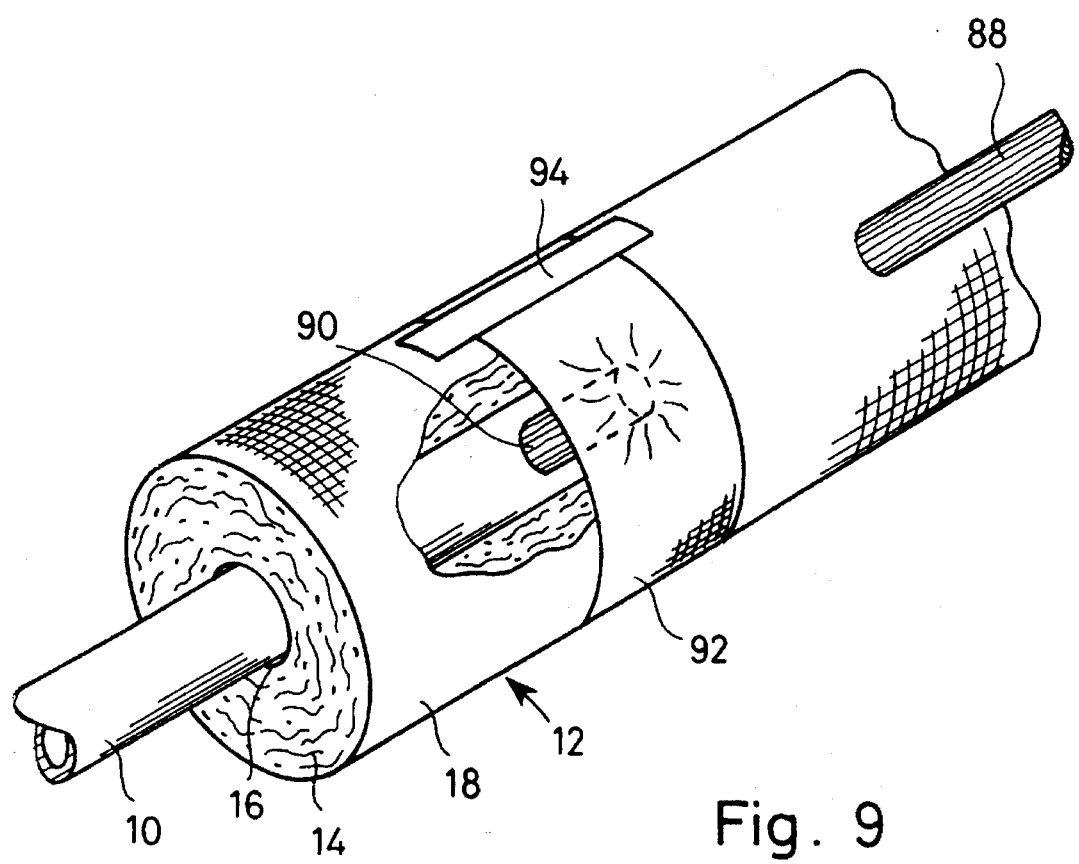
Fig. 9

Fig. 10
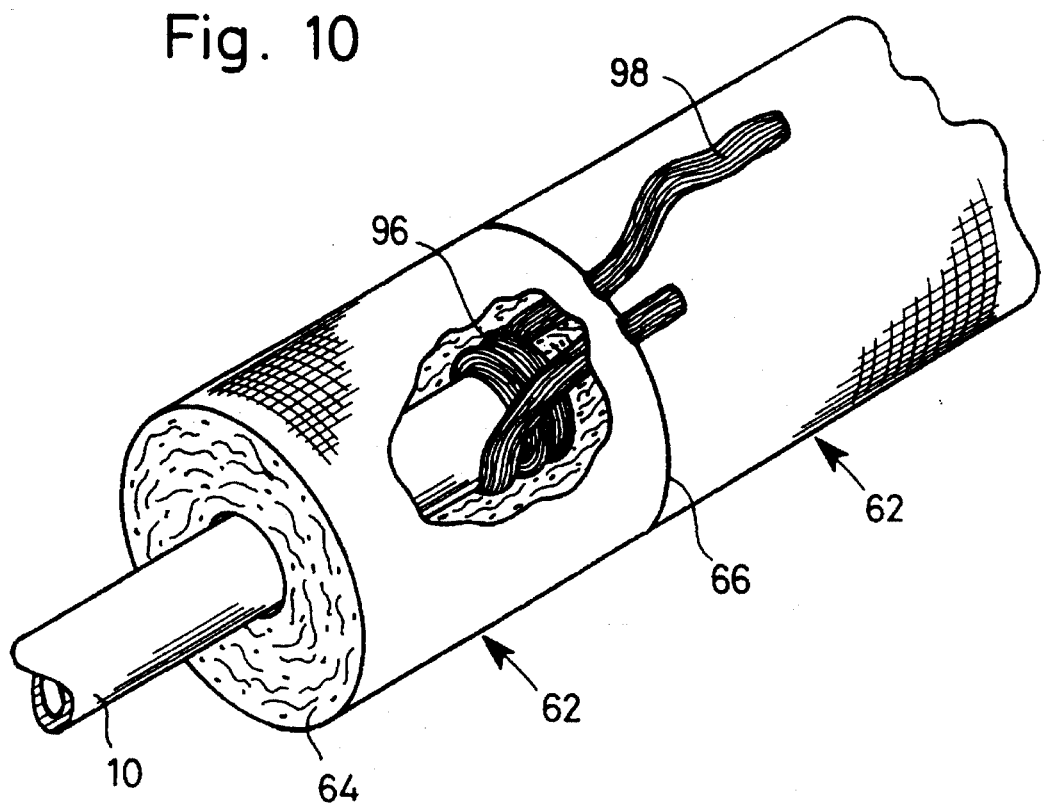
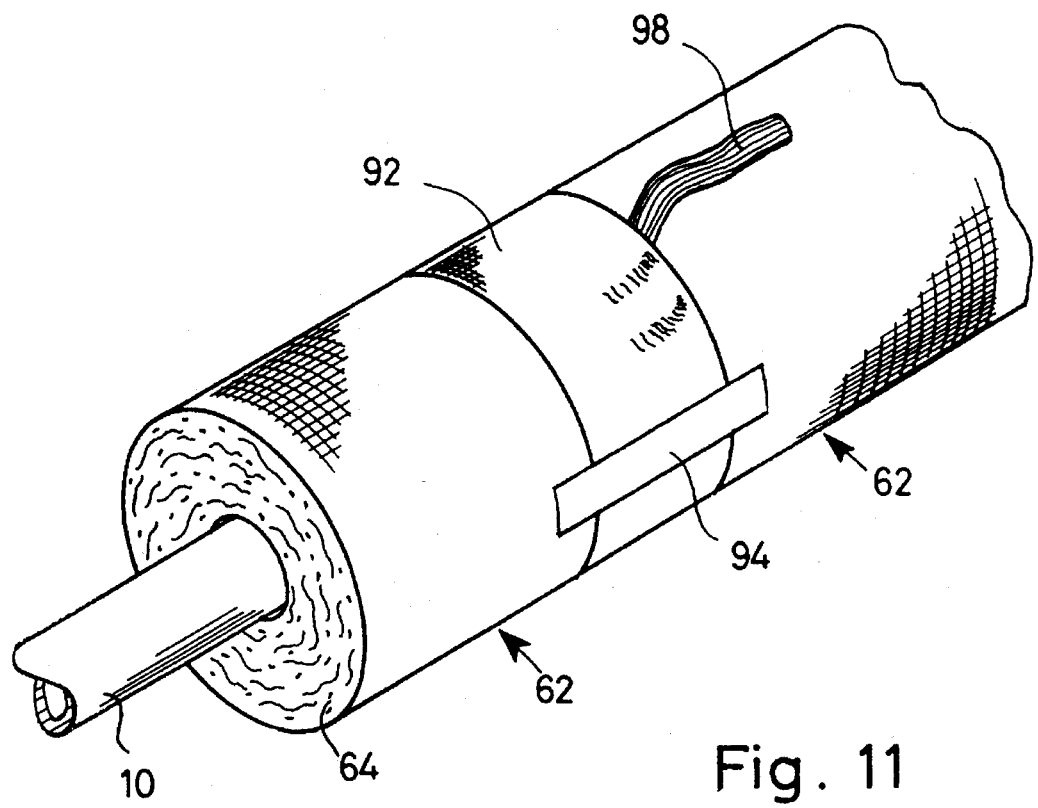
Fig. 11

Fig. 17
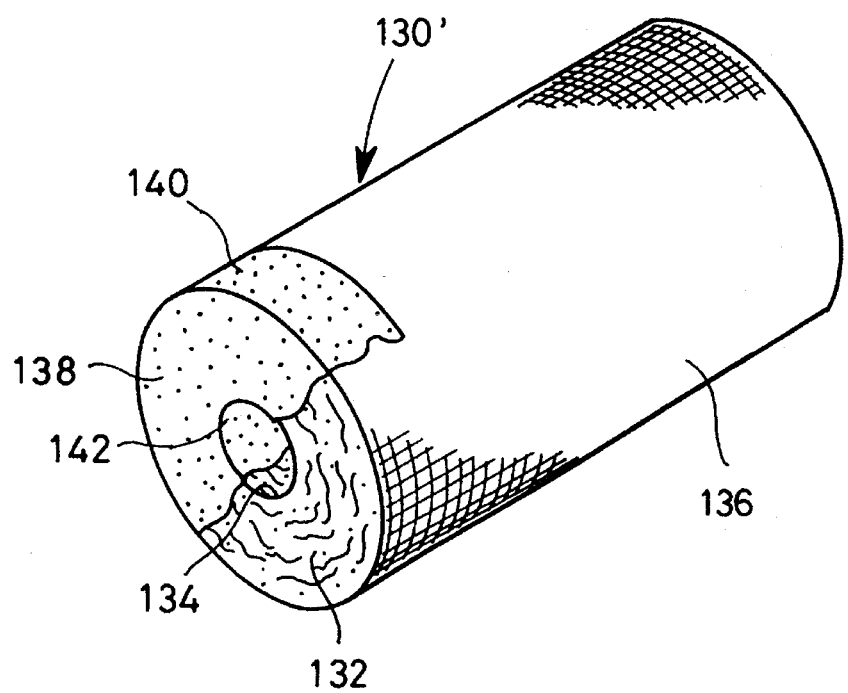
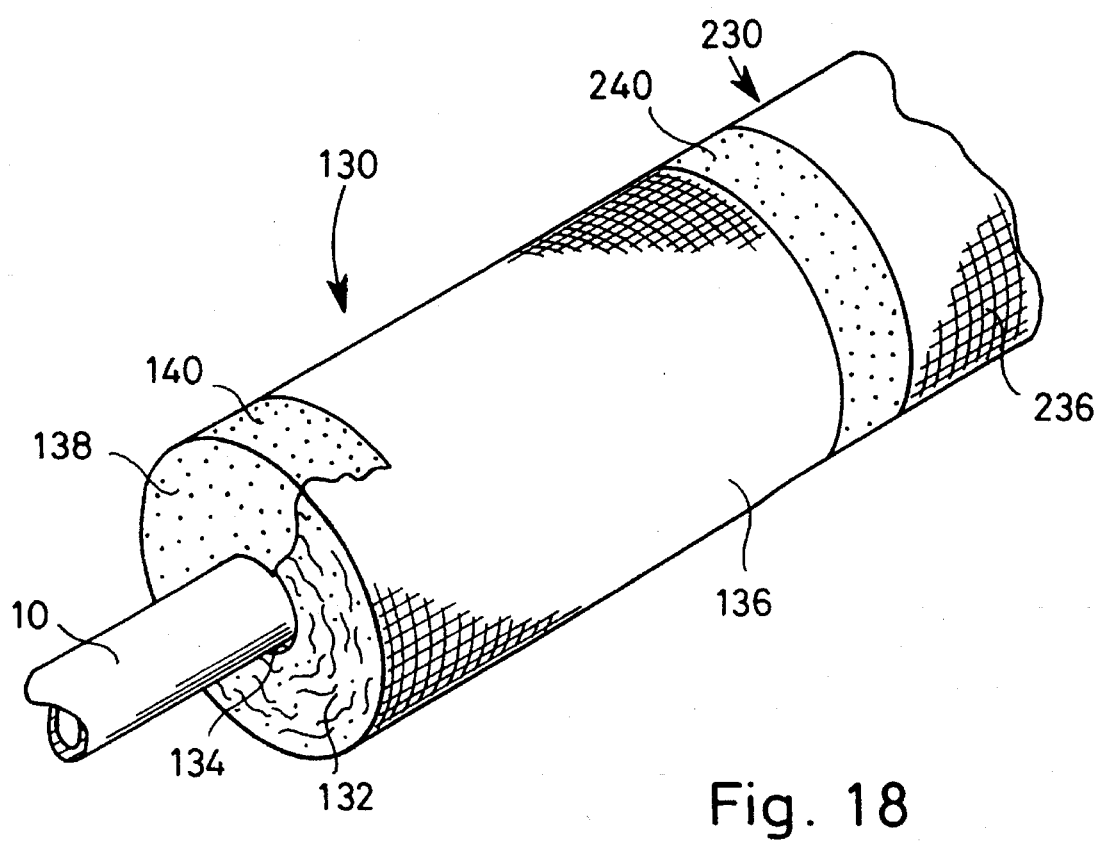
Fig. 18

Fig. 23
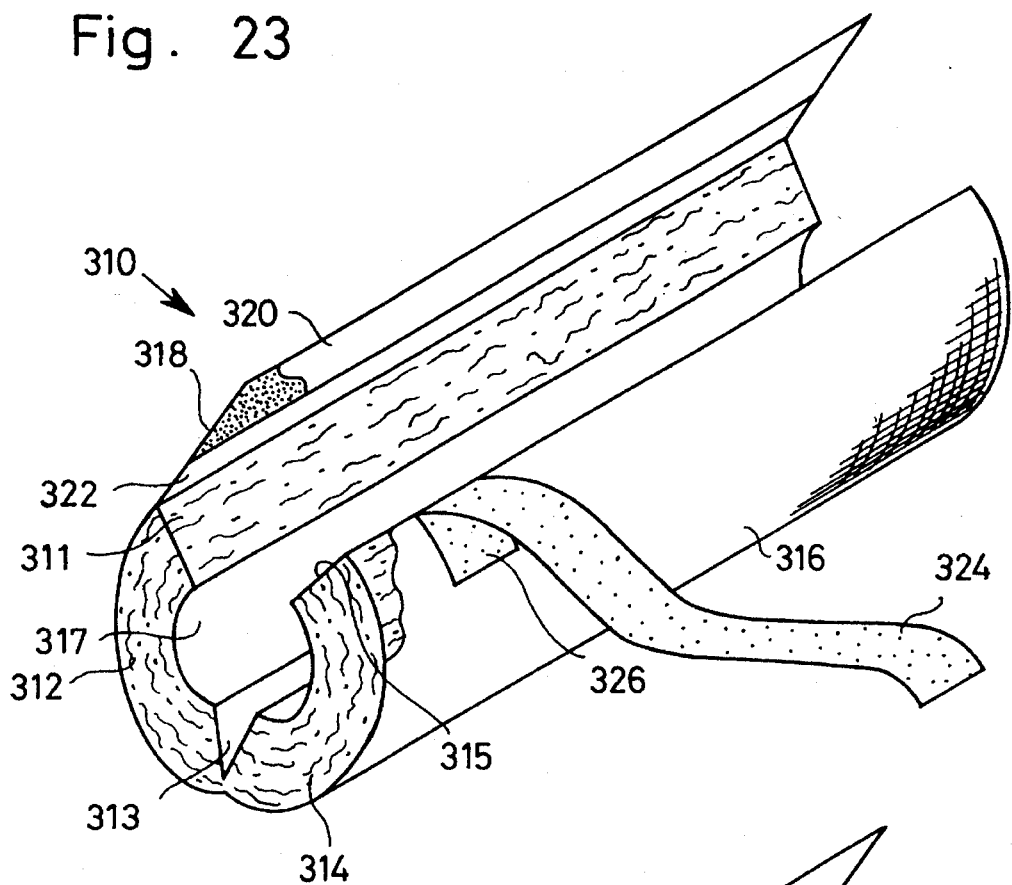
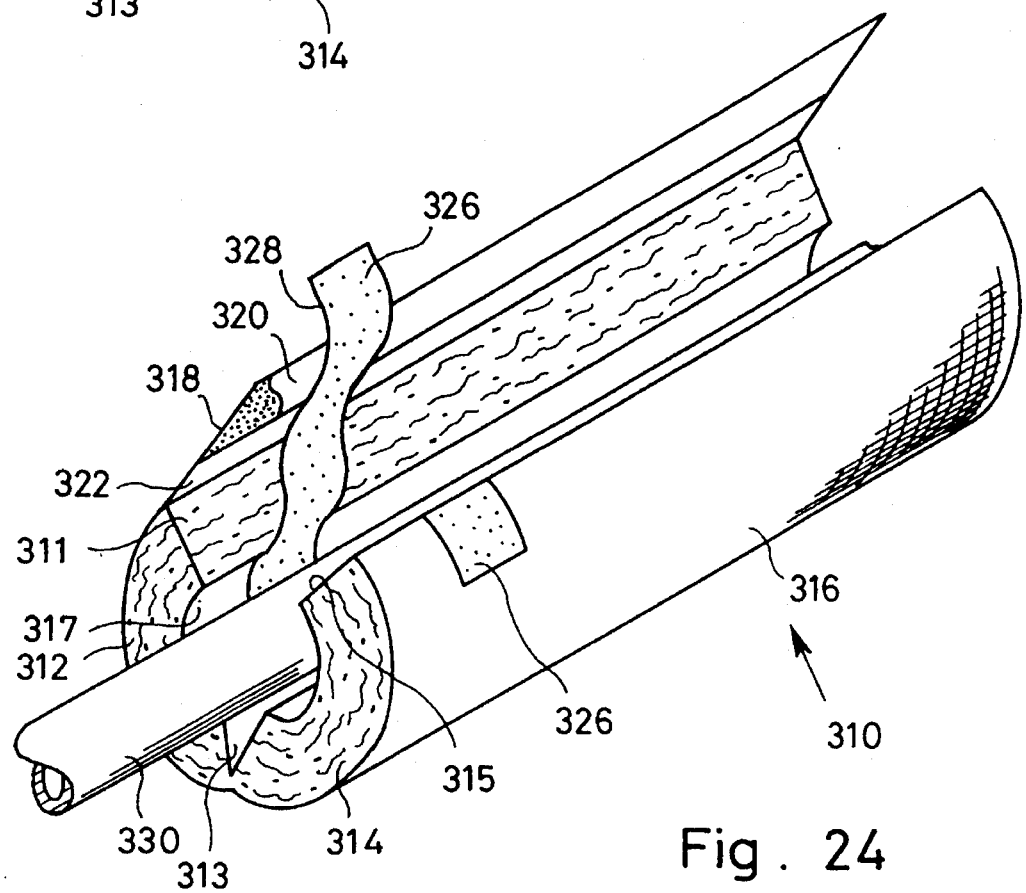
Fig. 24

METHOD AND APPARATUS FOR INSULATING

The present application is a continuation-in-part of PCT/DK93/00281, filed Aug. 27, 1993, which has designated the United States as a national stage country which is based on Danish priority application DK 1082/92, filed on Aug. 31, 1992, and Danish priority application DK 1413/92, filed on Nov. 24, 1992.

The present invention relates to the technical field of insulation. More precisely, the present invention relates to a technique involving insulating a surface of a body having a surface temperature at or below the dew point of the ambient air by means of an insulating layer.

In numerous applications, a body is kept at a temperature at or below the dew point of the ambient air, which body may e.g. constitute a pipe of a freezing or refrigerator system or of an air-conditioning system, or a pipe supplying cold water. Alternatively, the body may e.g. constitute a structure of a building which is exposed to a low temperature from the environment, whereas, in the present context, the ambient air refers to the heated air of the building, which ambient air is typically heated to a temperature above the temperature of the environment. The ambient air also contains an increased amount of moisture as compared to the environment. Furthermore, it has ben realized that even heat-insulating layers of pipes conducting heated water may in some instances be exposed to accumulating water as described in an article in the Norwegian magazine "Kulde" No. 5, October 1993, including a special issue relating to the technical field: "Teknisk Isolation" or in English language: "Technical insulating technique", page 4–6. According to the realization described in the above magazine, pipes normally conducting heated water or even steam may, provided the pipes are covered by an insulating layer and providing the pipe and the insulating layer are exposed to the environment such as rain, snow, fog, etc., generate accumulation of condensed water within the insulating layer under certain conditions such as reduced flow of hot water or steam through the pipe causing cooling of the pipe and exposure of the insulating layer to rain or snow. In the below description, reference is, however, solely made to a body having a surface temperature at or below the dew point of the ambient air which, however, is by no means to be construed limiting the technical field of the present invention to insulating surfaces of bodies having surface temperatures at or below the dew point of the ambient air and excluding equivalent technical areas such as the above described pipes conducting hot water or steam which as described above, may also give origin to the accumulation of condensed water within the heat-insulating layer of the pipes. The insulating layer may comprise mineral wool, such as glass wool, rock wool or slag wool, or may alternatively comprise foamed plastics or elastomeric materials, such as closed or open cells of foamed material, e.g. polyurethane foam, or may further alternatively comprise combinations of the materials mentioned above.

Hitherto, it has been attempted to block transfer of moisture from the ambient air to the body in question having a surface temperature at or below the dew point of the ambient air by providing a moisture-transfer blocking foil, such as an aluminum or plastic foil, which serves to block the diffusion of moisture into the insulating layer and further into contact with the surface of the body having a surface temperature at or below the dew point of the ambient air.

Various problems, however, occur, such as problems relating to foil junctions and perforation of the foil constituting the moisture or water-transport-blocking barrier, and these problems in some instances, in particular in connection with non-water repellent products or materials, result in moisture penetrating into the insulating layer and causing generation of condensed water at the surface of the body. The generation of condensed water at the surface of the body, firstly, results in a reduction of the insulating property of the insulating layer, and may, secondly, cause corrosion and/or deterioration of the surface of the body or of the body itself and/or of the insulating layer.

From international patent application No. PCT/DK91/00132, publication No. WO 91/18237, an insulating system for insulating e.g. a pipe supplying cold water is described. This insulating system is of an elaborated structure, which renders the insulating system complex and expensive. A serious drawback relating to the insulating system known from the above-mentioned international patent application is the fact that the insulating system is adapted to new applications exclusively, as existing insulating systems simply have to be replaced by insulating systems implemented in accordance with the teachings of the above-mentioned international patent application. A further drawback relating to the insulating system known from the above-mentioned international patent application relates to the fact that the insulating system is extremely slowly responding to the generation of condensed water at the surface of the body which is insulated by means of the insulating system since the insulating system accumulates a fairly large amount of condensed water before the draining system for draining the condensed water becomes operative.

An object of the present invention is to provide a simple device for removing condensed water from a surface of a body having a surface temperature at or below the dew point of the ambient air, which device, on the one hand, renders it possible to renovate existing insulating systems, and, on the other hand, is adaptable to specific application requirements, such as requirements relating to the water-removal capacity requested, the moisture content of the ambient air, and further the temperature difference between the surface temperature of the body and the temperature of the ambient air.

A further object of the present invention is to provide an integral heat-insulating assembly comprising devices implemented in accordance with the teachings of the present invention, which heat-insulating assembly fulfills the requirements for removing condensed water from the surface of a body having a surface temperature at or below the dew point of the ambient air.

A further object of the present invention is to provide a simple technique for removing condensed water from a surface of a tubular body having a surface temperature at or below the dew point of the ambient air, which technique, on the one hand, is swift responding to the presence of condensed water, and, on the other hand, is adaptable to specific application requirements, such as requirements relating to the water-removal capacity requested, the moisture content of the ambient air, and further the temperature difference between the surface temperature of the body and the temperature of the ambient air.

A still further object of the present invention is to provide a novel technique rendering it possible to renovate existing insulating systems without removing the existing insulating system such as an existing heat-insulating assembly, still fulfilling specific requirements relating to the water-removal capability requested, the moisture content of the air, and further the temperature difference between the surface temperature of the body and the temperature of the ambient air.

A particular advantage of the present invention is the fact that the device for removing condensed water from the surface of a body having a surface temperature at or below the dew point of the ambient air is readily applicable in connection with existing insulating applications and further in connection with renovation of existing insulating applications or alternative insulating applications where condensed water is removed in accordance with the teachings of the present invention, yet inadequately or insufficiently.

A further advantage of the present invention originates from the fact that according to the novel technique of renovating existing insulating systems, the condensed water is removed from the surface of the body having a surface temperature at or below the dew point of the ambient air by providing access to the surface of the body at a single point or along a line such as through a through-going passage or a slit extending through an annular insulating assembly circumferentially encircling the body being of a tubular configuration.

A further feature of the present invention is to provide a novel technique rendering it possible to provide insulating systems from an integral heat-insulating assembly, still fulfilling specific requirements relating to the water-removal capability requested, the moisture content of the air, and further the temperature difference between the surface temperature of the body and the temperature of the ambient air.

A particular feature of the present invention originates from the fact that the device for removing condensed water from the surface of a body having a surface temperature at or below the dew point of the ambient air is readily replaceable by a novel water-removal device, provided the water-removal device is malfunctioning or is of an inadequate or insufficient water-removal capability.

A further feature of the present invention relates to the fact that existing insulating systems may be renovated for the removal of condensed water from the surface of the body which is insulated by means of the insulating system in question by the employment of merely two additional components or elements which are easily applied at the application site in question without the need of specialized equipment or extreme skill as the components or elements are readily adaptable to the application in question, i.e. the insulating system in question, and readily applied by means of hand tools and fixation elements such as adhesive tape or the like.

A further advantage of the present invention is the fact that the heat-insulating assembly is readily and easily applicable for providing adequate and sufficient removal of condensed water from a tubular body, such as a pipe.

The above objects, the above advantages and the above features, together with numerous other objects, advantages and features, which will be evident from the below detailed description of preferred embodiments of the device and the insulating assembly according to the present invention, are, in accordance with a first aspect of the present invention, obtained by a device for removing condensed water from a surface of a body having a surface temperature at or below the dew point of the ambient air, the surface being insulated relative to the ambient air by means of a heat-insulating assembly defining an outer surface and an assembly thickness, the device comprising:

a conduit means of a tubular configuration and defining an inner through-going passage, the conduit means having a length substantially equal to the assembly thickness, and the conduit means defining opposite first and second open ends, a plug means of a water-transport-allowing material, the plug means being received within the conduit means and constituting a filling of the inner through-going passage, the water-transport-allowing material being exposed at the first open end of the conduit means, a water evaporation means of a water-transport-allowing material, the evaporation means defining an exposed evaporation surface and being arranged at the second open end of the conduit means, and the evaporation means communicating with the plug means at the second open end of the conduit means so as to allow transfer of water from the plug means to the evaporation means, and a fastening means for fastening the conduit means relative to the insulating assembly in a position in which the conduit means extends through a through-going aperture of the insulating assembly, so as to position the first open end of the conduit means adjacent to the surface of the body, and so as to allow transfer of condensed water from the surface of the body to the water-transport-allowing material of the plug means being exposed at the first open end of the conduit means, and in which position the exposed evaporation surface of the evaporation means is positioned at the outer surface of the heat-insulating assembly and is exposed to the ambient air.

The device for removing condensed water from the surface of a body having a surface temperature at or below the dew point of the ambient air is of a simple structure and comprises a total of four means, including a conduit means, a plug means, a water evaporation means and a fastening means, yet still fulfills the above objects, the above advantages, and the above features.

The above objects, the above advantages and the above features, together with numerous other objects, advantages and features, which will be evident from the below detailed description of preferred embodiments of the device and the insulating assembly according to the present invention, are, in accordance with a second aspect of the present invention, obtained by means of a heat-insulating assembly for insulating a surface of a body relative to the ambient air, the surface of the body having a surface temperature at or below the dew point of the ambient air, which heat-insulating assembly comprises:

a heat-insulating layer defining an outer surface and an assembly thickness, and a device for removing condensed water from the surface of the body, comprising:

a conduit means of a tubular configuration and defining an inner through-going passage, the conduit means having a length substantially equal to the assembly thickness, and the conduit means defining opposite first and second open ends, a plug means of a water-transport-allowing material, the plug means being received within the conduit means and constituting a filling of the inner through-going passage, the water-transport-allowing material being exposed at the first open end of the conduit means, a water evaporation means of a water-transport-allowing material, the evaporation means defining an exposed evaporation surface and being arranged at the second open end of the conduit means, and the evaporation means communicating with the plug means at the second open end of the conduit means so as to allow transfer of water from the plug means to the evaporation means, and the conduit means being received within a through-going aperture of the heat-insulating layer and fastened relative thereto in a position in which the first open end of the conduit means is positioned adjacent to the surface of the body, so as to allow transfer of condensed water from the surface of the body to the water-transport-allowing material of the plug means being exposed at the first open end of the conduit means, and in which position the exposed evaporation surface of the evaporation means is positioned at the outer surface of the heat-insulating layer and is exposed to the ambient air.

The heat-insulating assembly according to the second aspect of the present invention basically constitutes a heat-insulating assembly, of which the device according to the first aspect of the present invention constitutes an integral component.

In the present context, the expression "the water-transport-allowing material" means any material allowing the transfer or transport of water through the material from the surface of the body, through the heat-insulating assembly and to the ambient air. Preferably, the material constituting the water-transport allowing material exibit characteristics promoting or accelerating the transfer of water through capillary action, through suction, through hygroscopic characteristics of the material or any other action or through any other characteristic of the material having chemical or physical origin.

According to presently preferred embodiments of the device and of the insulating assembly according to the first and the second aspects of the present invention, the water-transport-allowing material of the plug means and further the water-transport-allowing material of the water evaporation means are preferably capillary suction materials rendering it possible to provide the device according to the first aspect of the present invention and a device constituting an integral component of the heat-insulating assembly according to the second aspect of the present invention in any arbitrary orientation relative to the vertical orientation as the condensed water is removed from the surface of the body in question through capillary suction irrespective of the gravitational force to which the condensed water is exposed.

Further according to the presently preferred embodiments of the device and of the insulating assembly according to the first and the second aspects of the present invention, the water-transport-allowing material of the plug means preferably protrudes from the first open end of the conduit means in order to ensure that condensed water present at the surface of the body is caused to be transferred to the water-transport-allowing material of the plug means and further to the water-transport-allowing material of the water evaporation means for causing evaporation of the condensed water therefrom.

The conduit means of the device according to the first aspect of the present invention and of the heat-insulating assembly according to the second aspect of the present invention may constitute a single element, such as a tubular element, yet preferably comprises a flange means provided at the second open end of the conduit means, which flange means defines a support surface for supporting the evaporation means. For fixating the evaporation means relative to the flange means of the conduit means, the support surface may, in accordance with advantageous embodiments of the device and the heat-insulating assembly according to the first and the second aspects of the present invention, be provided with an adhesive layer for adhering the evaporation means to the support surface of the flange means.

The flange means of the device according to the first aspect of the present invention may additionally serve the purpose of providing and defining a contact surface for establishing facial contact with the insulating assembly and consequently for fixating the device relative to the insulating assembly. The fixation of the device according to the first aspect of the present invention relative to the insulating assembly may be established by means of an adhesive layer provided at the contact surface of the flange means, which adhesive layer consequently constitutes the fastening means for fastening the conduit means relative to the insulating assembly. The fastening means may alternatively be provided by adhesive strips provided at the water evaporation means, by locking means, such as bards, provided at the conduit means or by any other appropriate fixation or fastening means constituting separate or integral elements or components of the conduit means, the plug means and of the water evaporation means characteristic of the device according to the first aspect of the present invention.

A particular application of the device and the heat-insulating assembly according to the first and the second aspects of the present invention relates to the field of removing condensed water from a pipe supplying e.g. a freezing or refrigerator fluid or cold water, and which is insulated by means of an annular insulating assembly circumferentially encircling the pipe, which constitutes the body having a surface temperature at or below the dew point of the ambient air.

According to specific, advantageous embodiments of the device and the heat-insulating assembly according to the first and second aspects of the present invention for insulating pipes or similar conduits, the flange means is preferably of a curved configuration, further preferably constitutes a cylindrical segment. The cylindrical segment may define an arch of the order of 40°–240°, such as an arch of the order of 40°–60° or of the order of 180°–340°, preferably approximately 60° or approximately 200°–220°. For providing the fastening means constituting a cylindrical segment defining an arch of the order of 180°–240°, the flange means may constitute an element gripping round the insulating assembly and consequently constitute the fastening means of the device, which need not be provided with any additional means for fastening the conduit means relative to the insulating assembly.

The above objects, the above advantages and the above features, together with the numerous other objects, advantages and features, which will be evident from the below detailed description of preferred embodiments of the present invention, are, in accordance with a third aspect of the present invention, provided by means of a heat-insulating assembly for insulating a surface of a tubular body relative to the ambient air, the surface of the tubular body having a surface temperature at or below the dew point of the ambient air, which heat-insulating assembly comprises:

a heat-insulating layer defining an annular insulating body circumferentially encircling the tubular body, the annular insulating body defining an inner cylindrical surface and an outer cylindrical surface, the inner cylindrical surface being arranged juxtaposed the surface of the tubular body, a water-removal means of a water-transport-allowing material, the water-removal means being embedded within a through-going passage of the annular insulating body and being exposed at the inner cylindrical surface of the annular insulating body so as to allow transfer of condensed water from the surface of the tubular body to the water-transport-allowing material of the water-removal means, and a water evaporation means of a water-transport-allowing material, the evaporation means defining an exposed evaporation surface and being arranged at the outer cylindrical surface of the annular insulating body and communicating with the water-removal means so as to allow transfer of water from the water-removal means to the evaporation means, the exposed evaporation surface of the evaporation means being exposed to the ambient air.

According to the presently preferred embodiment of the heat-insulating assembly according to the third aspect of the present invention, the water-transport-allowing material of the water removal means and of the water evaporation means are preferably capillary suction materials in order to obtain the advantages discussed above with reference to the first and second aspects of the present invention.

According to the third aspect of the present invention, the water-transport-allowing material of the water-removal means preferably protrudes from the inner cylindrical surface of the annular insulating body.

According to a first advantageous embodiment of the heat-insulating assembly according to the third aspect of the present invention, the water-removal means is constituted by an annular disc of the water-transport-allowing material, which annular disc is embedded between two cylindrical segments of the annular insulating body.

The water-removal means of the heat-insulating assembly according to the third aspect of the present invention may be constituted by a separate element or component, such as a foil of the water-transport-allowing material, or, according to an advantageous embodiment of the heat-insulating assembly, be constituted by an annular segment of the annular, disc-shaped water-removal means protruding from the outer cylindrical surface of the annular insulating body.

According to a second advantageous embodiment of the heat-insulating assembly according to the third aspect of the present invention, the water-removal means is constituted by a cord of the water-transport-allowing material, which cord is arranged circumferentially encircling the tubular body and is embedded between two cylindrical segments of the annular insulating body, which cylindrical segments together define the through-going passage. According to the second advantageous embodiment of the heat-insulating assembly according to the third aspect of the present invention, the cord of the water-transport-allowing material is simply arranged in a slit provided through the annular insulating body.

According to the second advantageous embodiment of the heat-insulating assembly according to the third aspect of the present invention, the evaporation means is preferably constituted by a foil of the water-transport-allowing material, which foil is arranged circumferential encircling the outer cylindrical surface of the annular insulating body. The communication between the cord of the water-transport-allowing material and the foil circumferentially encircling the outer cylindrical surface of the annular insulating body for allowing transfer of water from the cord to the foil is simply established by contacting the foil with a free end of the cord protuding from the outer cylindrical surface of the annular insulating body from the through-going passage through which the cord extends.

According to a third advantageous embodiment of the heat-insulating assembly according to a third aspect of the present invention, the water-removal means is constituted by a layer of a hygroscopic paint applied to an annular end surface part of a cylindrical segment of the annular insulating body, which annular end surface part of the cylindrical segment together with an annular end surface part of an adjacent cylindrical segment of the annular insulating body define the through-going passage. Surprisingly, it has been realized that a hygroscopic paint may simply serve as the water-removal means for transfer of water from the surface of the body through the heat-insulating assembly into the environment for evaporation from the evaporation means.

Furthermore, it has been realized that the hygroscopic paint may further serve as the evaporation means as the evaporation means may be constituted by a further layer of the hygroscopic paint applied to the outer cylindrical surface part of the annular insulating body.

The further layer of the hygroscopic paint constituting the evaporation means may be applied to the outer cylindrical surface of the cylindrical segment the annular end surface of which is provided with the layer of the hygroscopic paint constituting the water-removal means. Thus, the layer of the hygroscopic paint applied to the annular end surface part of the cylindrical segment and the further layer of the hygroscopic paint preferably constitute an integral layer of the hygroscopic paint. Alternatively, the partly hygroscopic paint applied to the outer cylindrical surface part of the annular insulating body may be applied to the outer cylindrical surface of the adjacent cylindrical segment or applied to the outer cylindrical surface part of the cylindrical segment the annular end surface part of which is provided with the layer of the hygroscopic paint constituting the water-removal means as well as the outer cylindrical surface of the adjacent cylindrical segment.

The third advantageous embodiment of the heat-insulating assembly according to the third aspect of the present invention may be implemented as a prefabricated segmented structure or alternatively be produced at the application side by simply applying the hygroscopic paint to an annular end surface part of a cylindrical segment of the annular insulating body, arranging the adjacent cylindrical segment of the annular insulating body and further applying the further layer of the hygroscopic paint at the outer cylindrical surface of the annular insulating body constituted by the cylindrical segments. The hygroscopic paint constituting the water removal means and also preferably the evaporation means may according to a further embodiment of the heat insulating assembly according to the third aspect of the present invention be provided at the inner cylindrical surface of the annular insulating body for increasing the area of contact between the water-removal means and the surface of the body which surface is to be drained.

The third advantageous embodiment of the heat insulating assembly according to the third aspect of the present invention preferably further comprises a perforated foil of a vapor barrier material applied to the water evaporation means and exposing the water evaporating means through perforations of the perforated foil. The perforated foil may, thus, constitute a foil serving the purpose of on the one hand protecting the further layer of the hygroscopic paint constituting the evaporation means and on the other hand exposing the evaporation means in order to allow evaporation of water from the evaporation means. The perforated foil may serve the additional purpose of closely adjoining the annular end surface parts of the adjacent cylindrical segments for providing a substantially continuous annular insulating body structure.

The above objects, the above advantages, and the above features together with numerous other objects, advantages, and features, which will be evident from the below detailed description of preferred embodiments of the inventions, are, in accordance with a fourth aspect of the present invention provided by a method of removing condensed water from a surface of a body having a surface temperature at or below the dew point of the ambient air, the surface being insulated relative to the ambient air by means of a heat-insulating assembly defining an inner surface arranged juxtaposed the surface of the body and an outer surface exposed to the ambient air, the method comprising:

provided a through-going passage extending through the heat-insulating assembly defining first and second open ends at the inner and outer surfaces, respectively, of the heat-insulating assembly, arranging a plug means of a water-transport-allowing material within the through-going passage constituting a filling thereof, the water-transport-allowing material being exposed at the first open end of the through-going passage, so as to allow transfer of condensed water from the surface of the body to the water-transport-allowing material of the plug means, and arranging a water evaporation means of a water-transport-allowing material defining an exposed evaporation surface at the second open end of the through-going passage, so as to establish communication between the plug means and the evaporation means at the second open end of the through-going passage, and so as to allow transfer of water from the plug means to the evaporation means, the exposed evaporation surface of the water evaporation means being exposed to the ambient air for evaporating water to the ambient air.

The above objects, the above advantages, and the above features together with numerous other objects, advantages, and features, which will be evident from the below detailed description of preferred embodiments of the inventions, are, in accordance with a fifth aspect of the present invention provided by a method of removing condensed water from a surface of a tubular body having a surface temperature at or below the dew point of the ambient air, the surface of the tubular body being insulated relative to the ambient air by means of a heat-insulating assembly defining an annular insulating body circumferentially encircling the tubular body, the annular insulating body defining an inner cylindrical surface and an outer cylindrical surface, the inner cylindrical surface being arranged juxtaposed the surface of the tubular body, and the outer cylindrical surface being exposed to the ambient air, the method comprising:

providing a through-going circumferential slit extending through the insulating body from the outer cylindrical surface to the inner cylindrical surface, arranging an elongated and flexible water-transport means of a water-transport-allowing material within the circumferential slit encircling the surface of the tubular body and extending from the inner cylindrical surface of the annular insulating body to the outer cylindrical surface of the annular insulating body, so as to allow transfer of condensed water from the surface of the body to the water-transport-allowing material of the water-transport means, and arranging a water evaporation means of a water-transport-allowing material defining an exposed evaporation surface at the outer cylindrical surface of the annular insulating body, so as to establish communication between the water-transport means and the water evaporation means at the outer cylindrical surface of the annular insulating body, and so as to allow transfer of water from the water-transport means to the evaporation means, the exposed evaporation surface being exposed to the ambient air for evaporating water to the ambient air.

The above objects, the above advantages, and the above features together with numerous other objects, advantages, and features, which will be evident from the below detailed description of preferred embodiments of the inventions, are, in accordance with a sixth aspect of the present invention provided by a method of removing condensed water from a surface of a tubular body having a surface temperature at or below the dew point of the ambient air, the surface of the tubular body being insulated relative to the ambient air by means of a heat-insulating assembly defining an annular insulating body circumferentially encircling the tubular body, the annular insulating body defining an inner cylindrical surface and an outer cylindrical surface, the inner cylindrical surface being arranged juxtaposed the surface of the tubular body, and the outer cylindrical surface being exposed to the ambient air, the method comprising:

providing a through-going circumferential slit extending through the insulating body from the outer cylindrical surface of the inner cylindrical surface so as to divide the annular insulating body into two segments having juxtaposed end surface parts, applying a layer of a hygroscopic paint to at least one of the end surface parts of the segments, the layer constituting a water transport means encircling the surface part of the tubular body and extending from the inner cylindrical surface of the annular insulating body to the outer cylindrical surface of the annular insulating body, so as to allow transfer of condensed water from the surface of the body to the water-transport means, and applying a further layer of a hygroscopic paint to the outer cylindrical surface of the annular insulating body, the further layer constituting a water evaporation means defining an exposed evaporation surface at the outer cylindrical surface of the annular insulating body, so as to establish communication between the water-transport means and the water evaporation means at the outer cylindrical surface of the annular insulating body, and so as to allow transfer of water from the water-transport means to the evaporation means, the exposed evaporation surface being exposed to the ambient air for evaporating water to the ambient air.

The above object, the above feature and the above advantage, together with numerous other objects, advantages and features, which will be evident from the below detailed description of preferred embodiments of the device and the insulating assembly according to the present invention, are, in accordance with a seventh aspect of the present invention, obtained by means of a heat-insulating assembly for insulating a surface of a tubular body relative to the ambient air, comprising:

a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body, and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating surface to be exposed to the ambient air for the evaporation of water transferred from said surface of said tubular body to said flap of said strip through said strip of said water transport-allowing material.

According to the present invention, the strip of water transport-allowing material is of a reduced size as compared to the draining system of the insulating system described in the above mentioned international patent application. Thus, it has been realized that the draining of condensed water from the surface of the tubular body which is insulated by means of an insulating layer such as an annular heat-insulating body is delayed until the water transport-allowing material is entirely soaked with water. Therefore, provided a large amount of water transport-allowing material is used, a fairly large amount of water has to be accumulated by the water transport-allowing material before the condensed water draining effect occurs. The accumulation of a fairly large amount of water within the water transport-allowing material is of course less advantageous since the presence of a fairly large amount of condensed water may, first, deteriorate the material of the tubular body such as the pipe and, secondly, deteriorate the insulating material or reduce the heat-insulating properties of the heat-insulating materials.

According to presently preferred embodiment of the heat-insulating assembly according to the seventh aspect of the present invention, the water transport-allowing material is preferably a capillary suction material rendering it possible to position the assembly according to the seventh aspect of the present invention in any arbitrary orientation relative to the vertical orientation as the condensed water is removed from the surface of the body in question through capillary suction irrespective of the gravitational force to which the condensed water is exposed.

The heat-insulating assembly according to the present invention may be produced from any insulating material such as mineral wool, glass wool, rockwool or slack wool, foamed plastics material or elastomeric materials, such as closed or open cells of foamed material, e.g. polyurethane foam, or even combinations of the above-materials. Preferably, the annular heat-insulating body of the heat-insulating assembly according to the present invention prefebly comprises mineral fibers and is preferably made from mineral fibers.

In order to prevent that vapour or water may permeate through the slit extending through the annular heat-insulating body, the heat-insulating assembly according to the present invention preferably further comprises a sealing means for sealing the through-going slit of the annular heat-insulating body. The sealing means may be constituted by e.g. a length of a vapour-impermeable adhesive tape such as an aluminum tape provided with an adhesive surface coating. Alternatively, according to a advantageous embodiment of the heat-insulating assembly according to the present invention, the sealing means is constituted by a flap of the vapour barrier layer extending along the through-going slit of the annular heat-insulating body and has an adhesive coating for adhering to the vapour-barrier layer in overlapping relationship therewith along the through-going slit of the annular heat-insulating body.

According to a further embodiment of the heat-insulating assembly according to the seventh aspect of the present invention, the heat-insulating assembly comprises a perforated foil of a vapour-barrier material to be applied to the vapour-barrier layer covering the outer cylindrical surface of the annular heat-insulating body so as to expose the flap of the strip of the water transport-allowing material through perforations of the perforated foil. Alternatively, the flap of the strip exposed to the ambient air may freely extend from the outer cylindrical surface of the annular heat-insulating body, provided no risk of mechanically contacting and destroying the flap exists.

In a further advantageous embodiment of the heat-insulating assembly according to the seventh aspect of the present invention constituting an integral unitary structure to be applied to the tubular body to be insulated by means of the heat-insulating assembly, the strip defines opposite first and second ends, which first end is adhered to the annular heat-insulating body at the through-going slit of the annular heat-insulating body, and which second end defines the flap of the strip for the evaporation of water transferrred from the surface of the tubular body to the flap of the strip through the strip of the water transport-allowing material.

The above object, the above feature and the above advantage, together with numerous other objects, advantages and features, which will be evident from the below detailed description of preferred embodiments of the present invention, are, in accordance with an eighth aspect of the present invention, provided by means of a method of insulating a surface of a tubular body relative to the ambient air and removing condence water from said surface of said tubular body, comprising:

providing a heat-insulating assembly for insulating said surface of said tubular body, comprising:
a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body, and
a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating surface to be exposed to the ambient air for the evaporation of water transferred from said surface of said tubular body to said flap of said strip through said strip of said water transport-allowing material, and
arranging said heat-insulating assembly circumferentially encircling said tubular body so as to arrange said strip of said water transport-allowing material circumferentially encircling said surface of said tubular body, and so as to expose said flap of said strip at said outer cylindrical surface covered by said vapour-barrier layer for allowing water transferred from said surface of said tubular body through said water transport-allowing material of said strip to said flap to be evaporated.

The method according to the eighth aspect of the present invention may advantageously comprise any of the above described features of the heat-insulating assembly according to the seventh aspect of the present invention. Thus, the slit is preferably in accordance with an advantageous embodiment of the method according to the eighth aspect of the present invention sealed by means of a sealing means which as stated above may be constituted by a separate water-impermeable adhesive material or alternatively a flap of the vapour-barrier layer.

The slit exteniing through the annular heat-insulating body of the heat-insulating assembly according to the seventh aspect of the present invention and of the heat-insulating assembly to be used in accordance with the method according to the eighth aspect of the present invention may have any geometrical shape such as a curved configuration provided the slit extends in the entire length of the annular heat-insulating body allowing the annular heat-insulating body to be positioned circumferentially encircling the tubular body. Preferably, however, the slit is of a rectalinear configuration defining a slit extending length-wise along the annular heat-insulating body.

Figure 2:
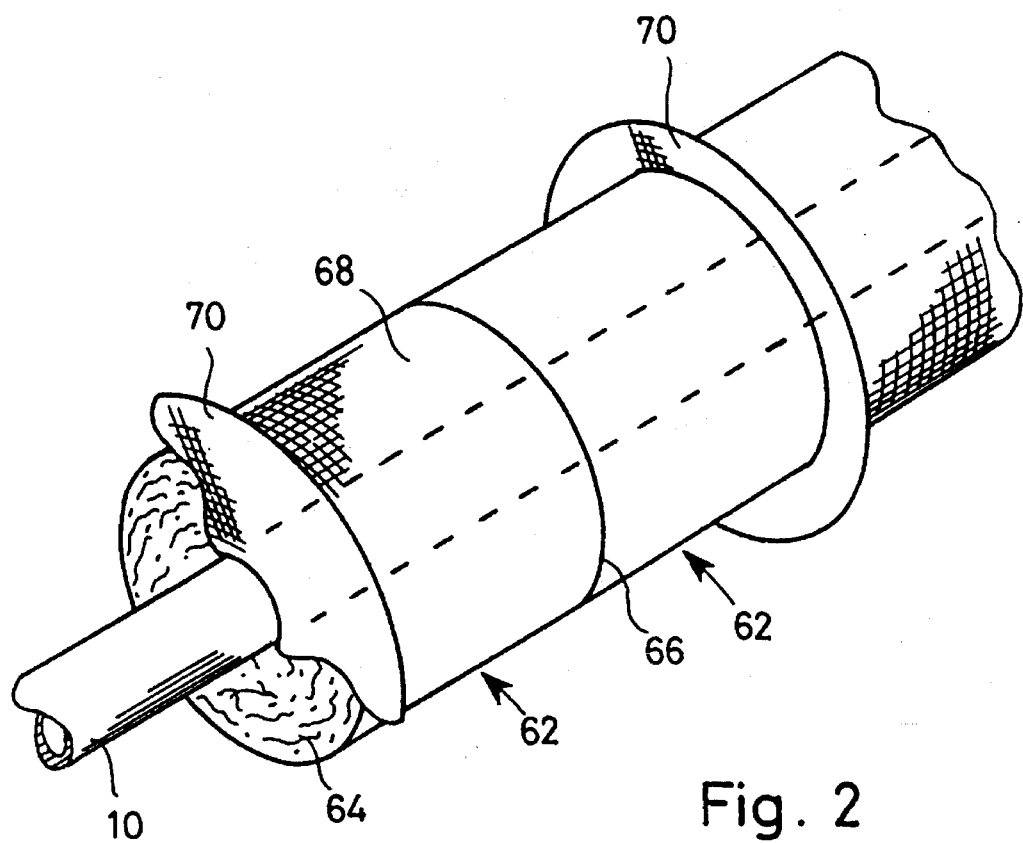
Figure 3:
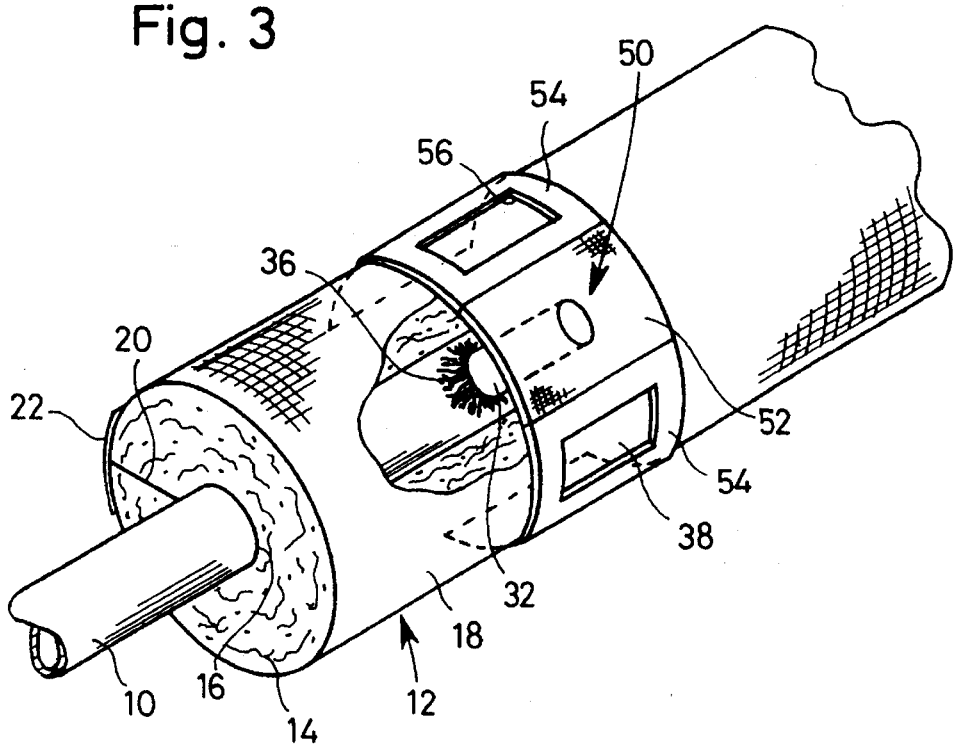
Figure 4:
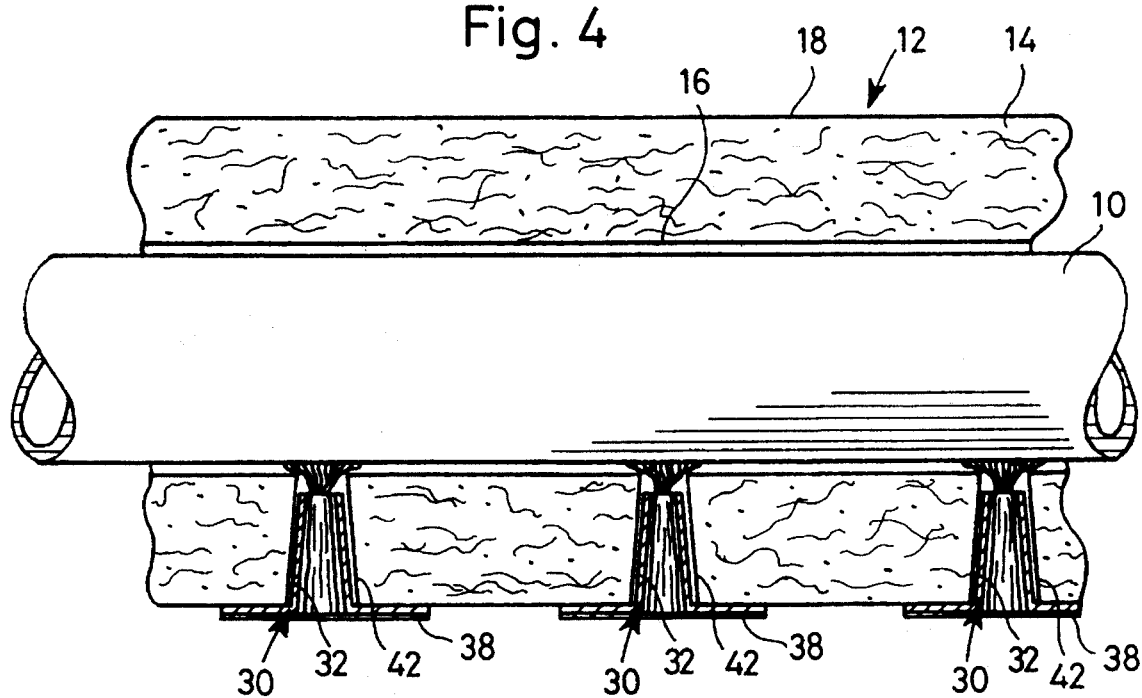
Figure 12:
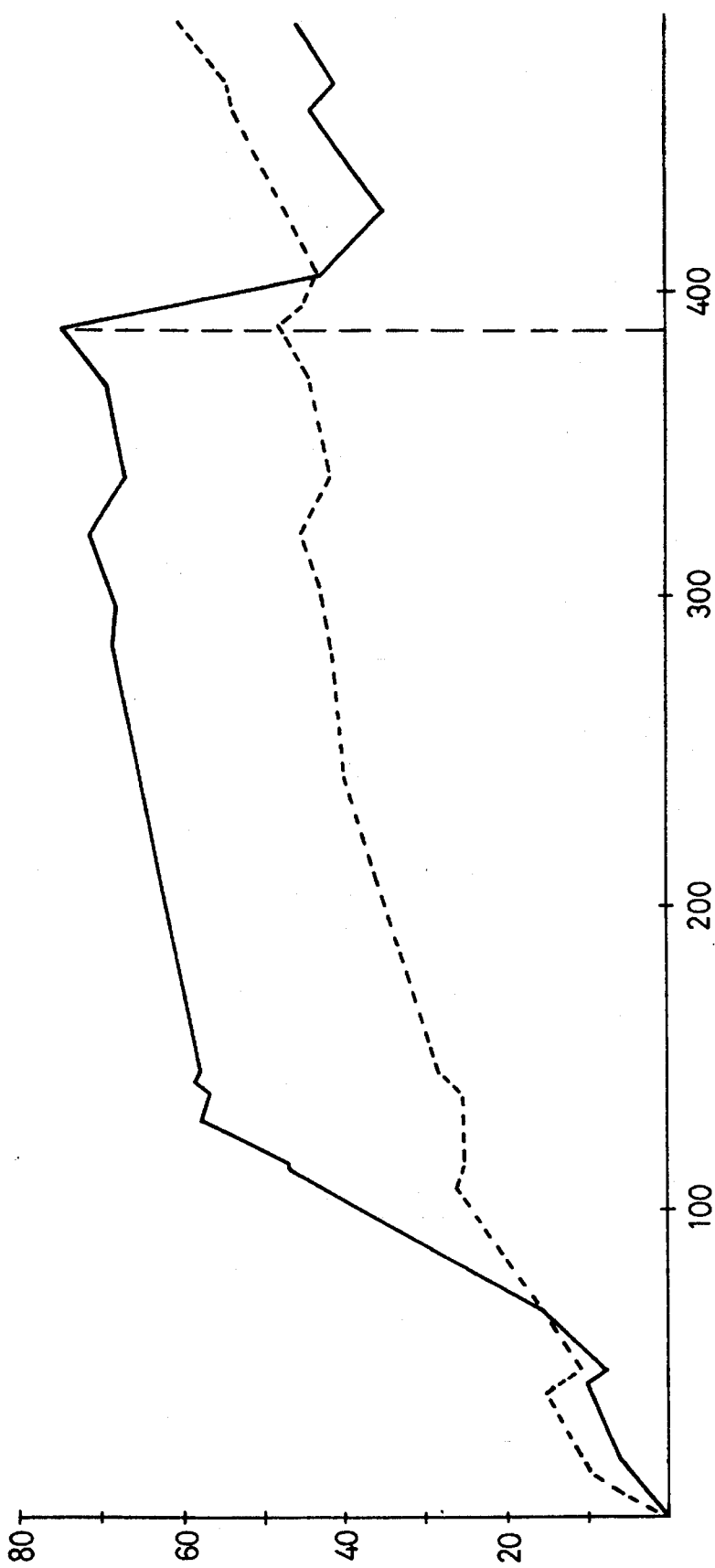
Figure 13:
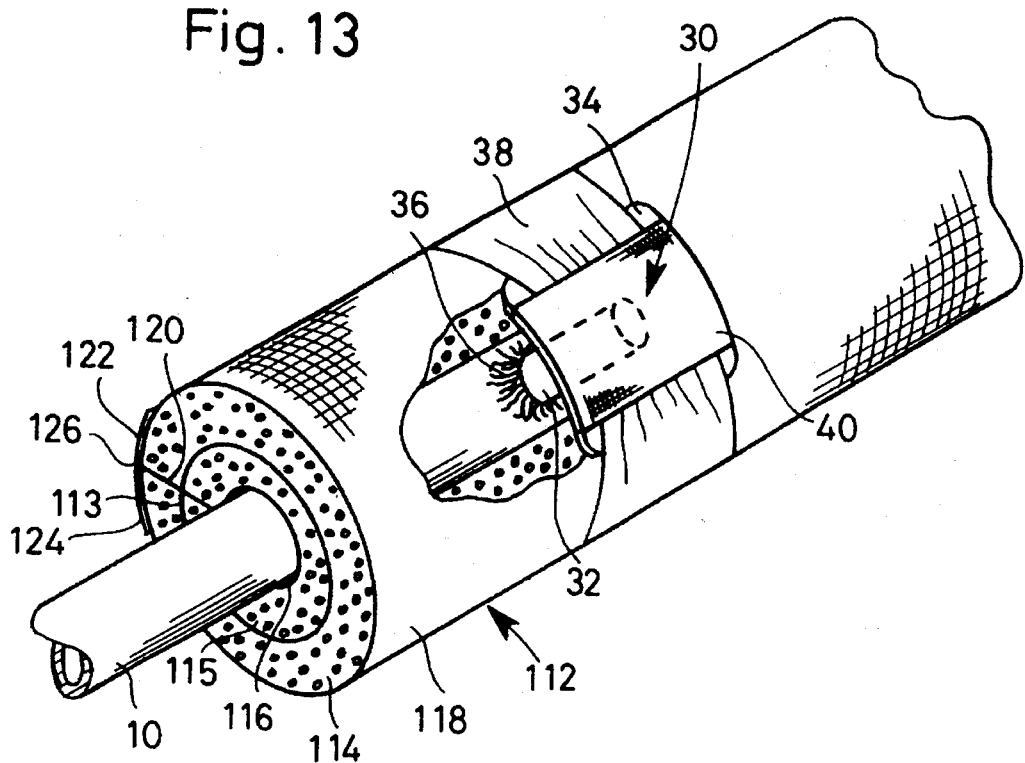
Figure 14:
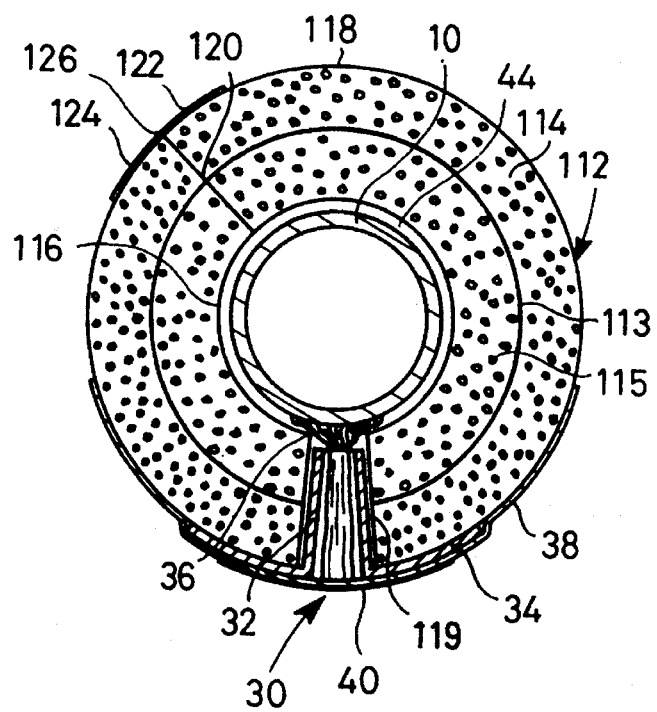
Figure 15:
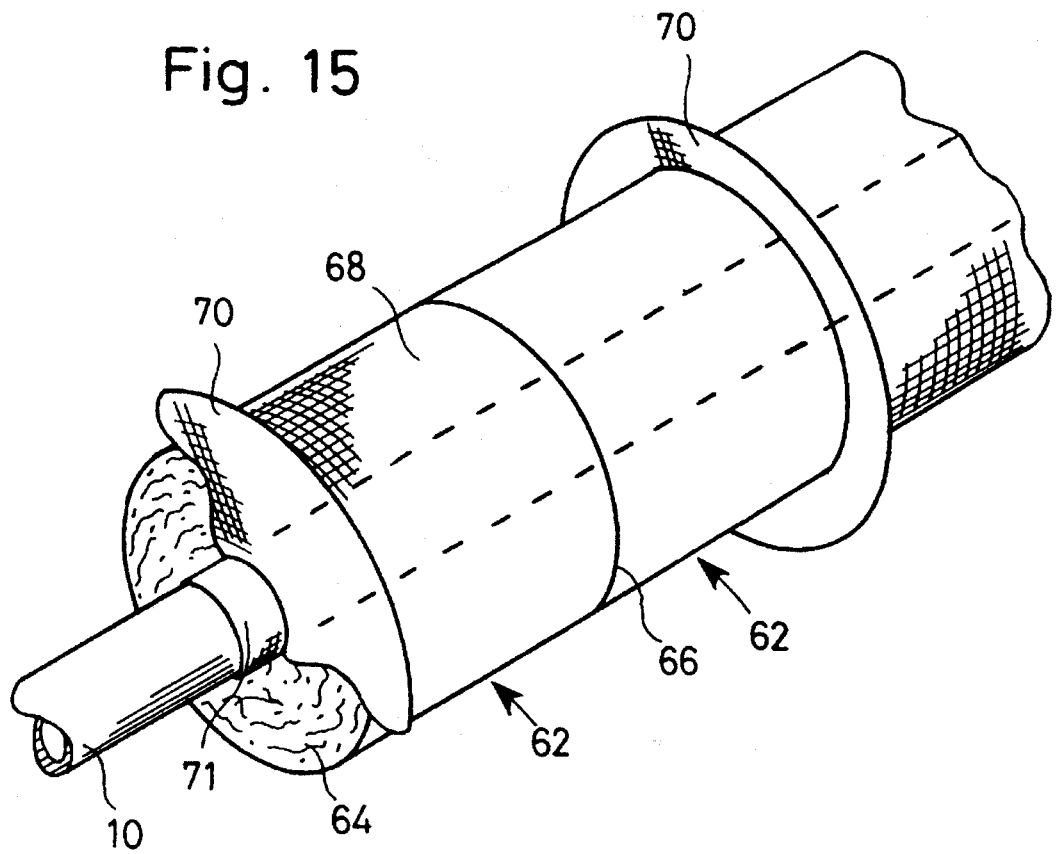
Figure 16:
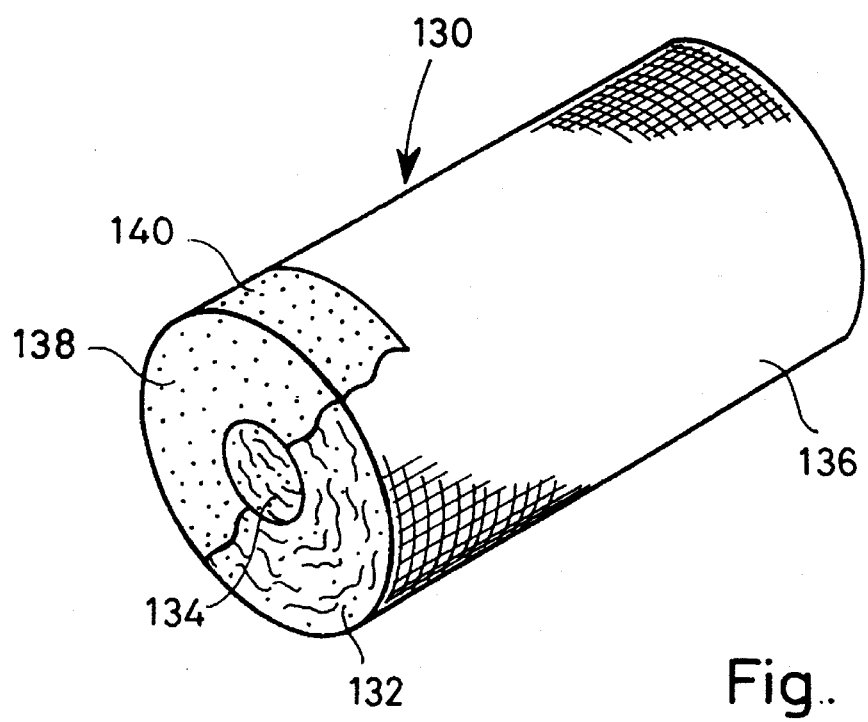
Figure 19:
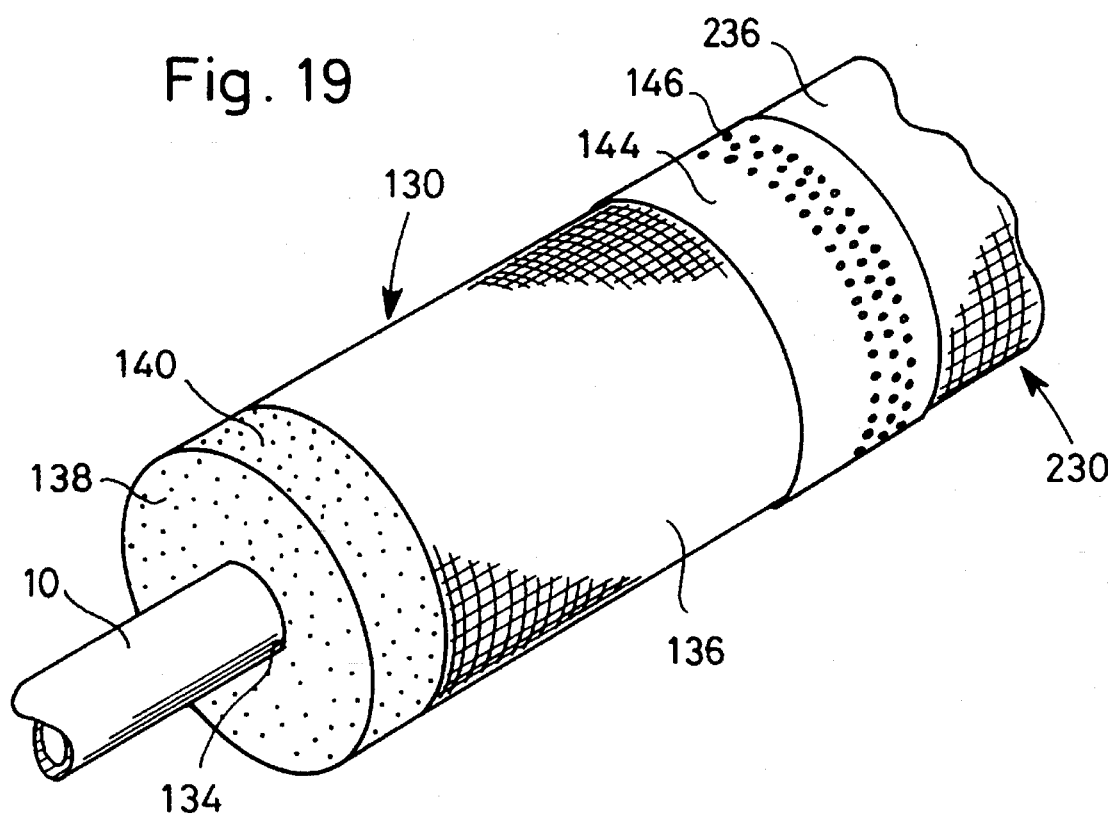
Figure 25:
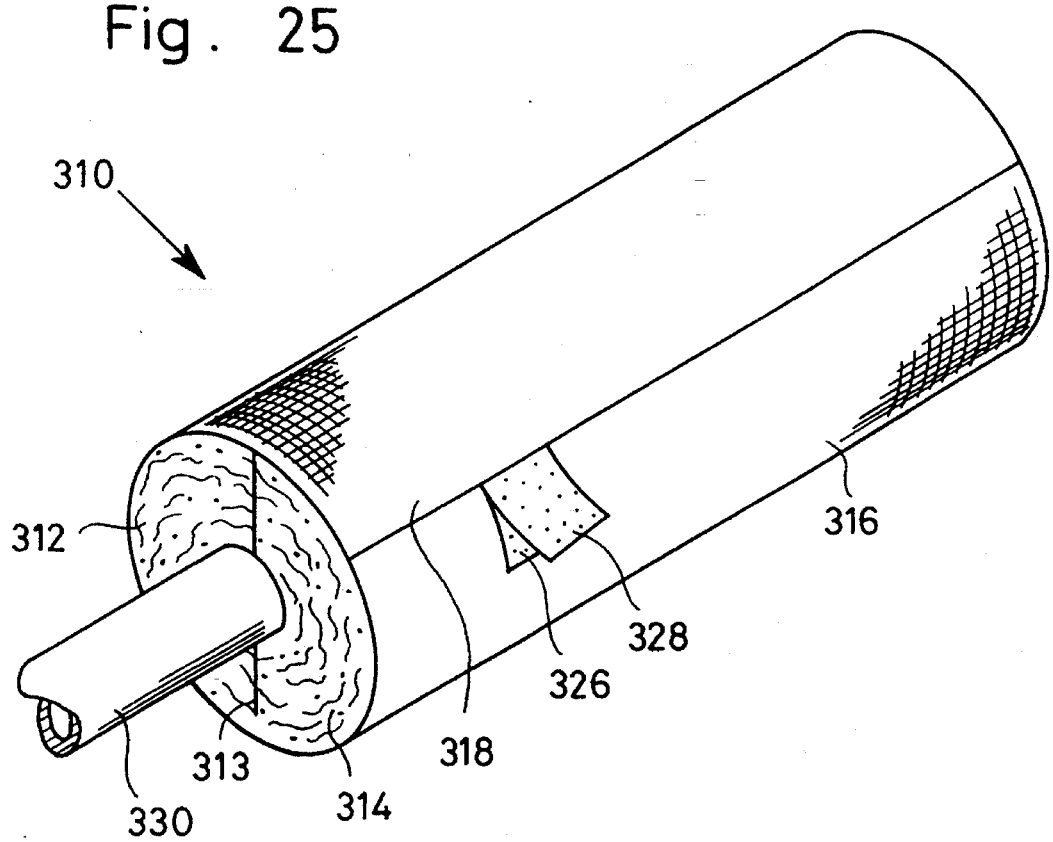
Figure 26:
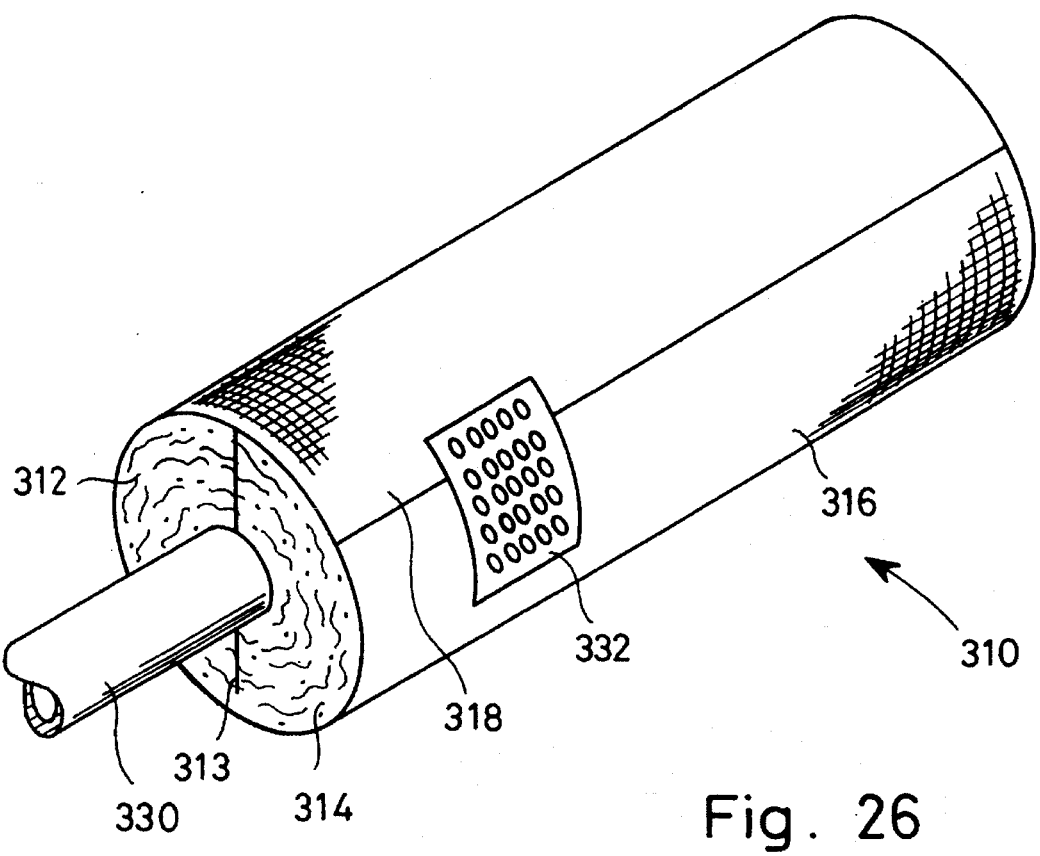
Figure 27:
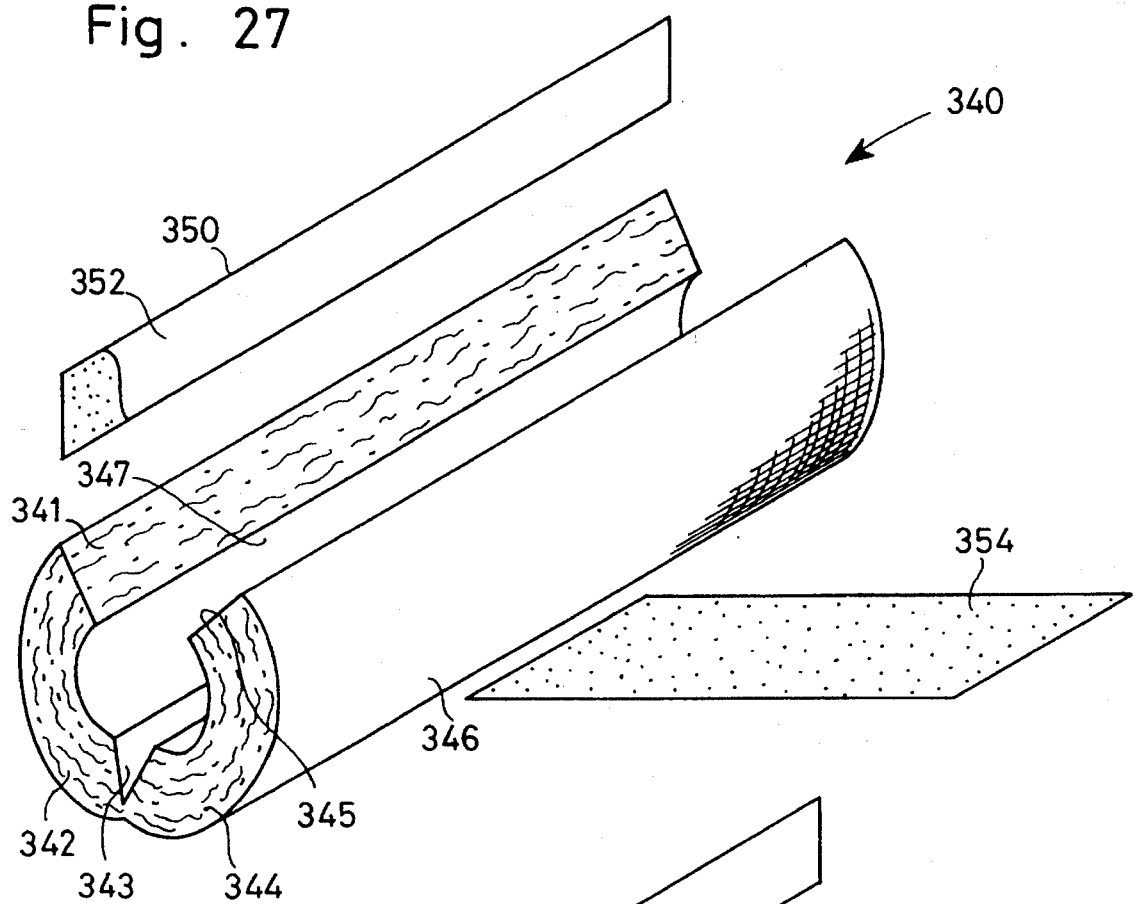
Figure 28:
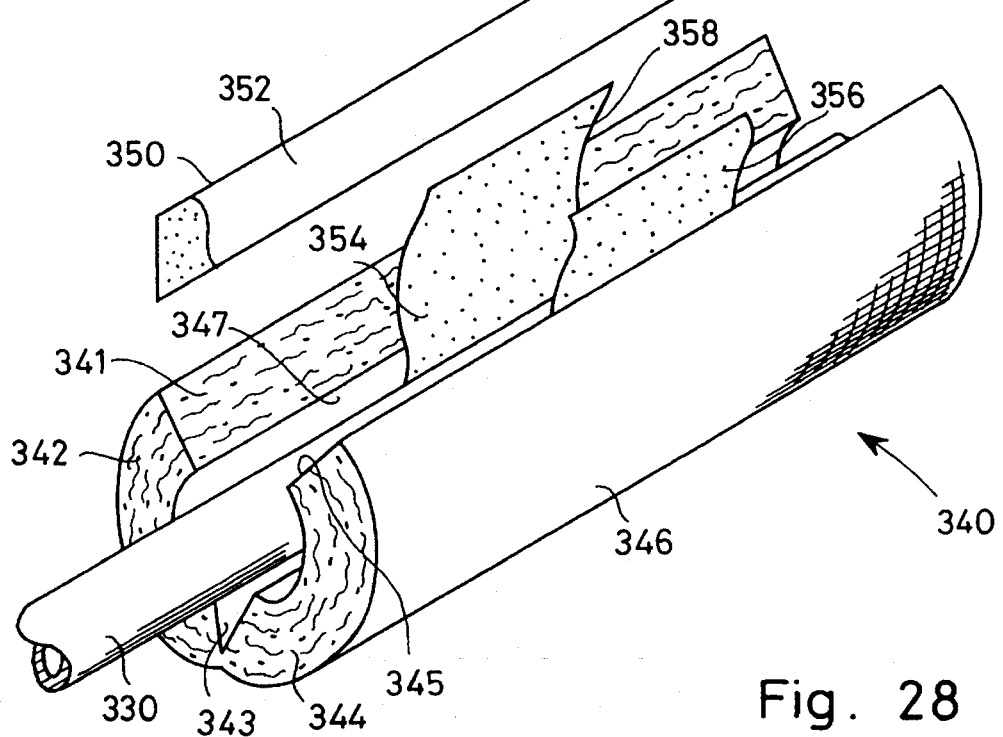
Figure 29:
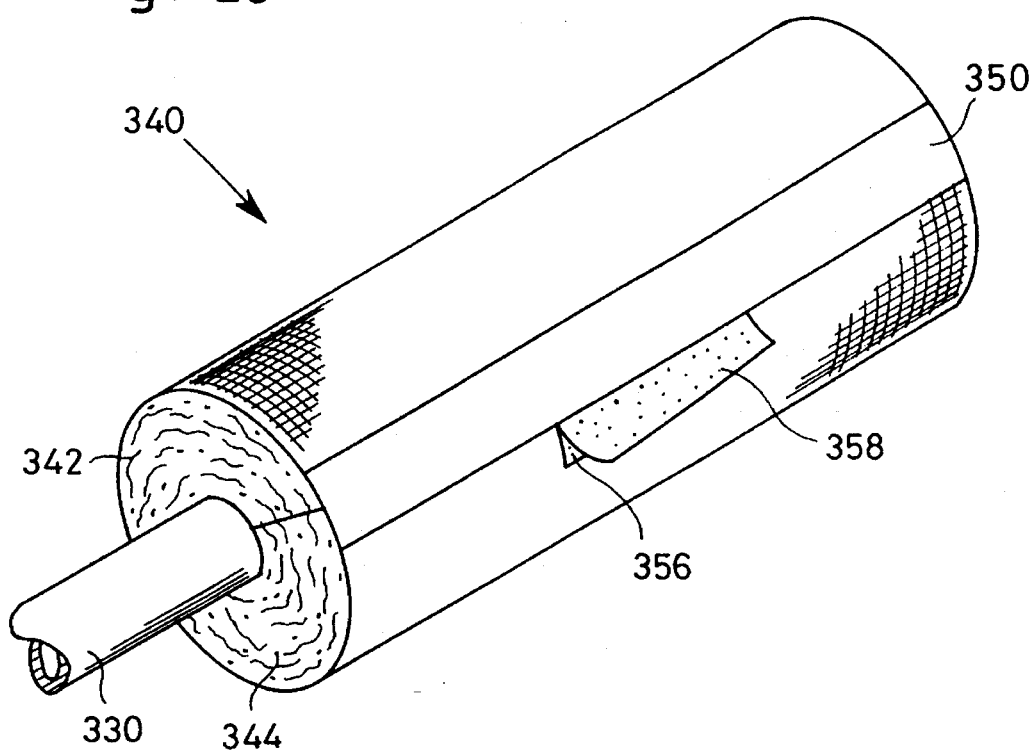
Figure 30:
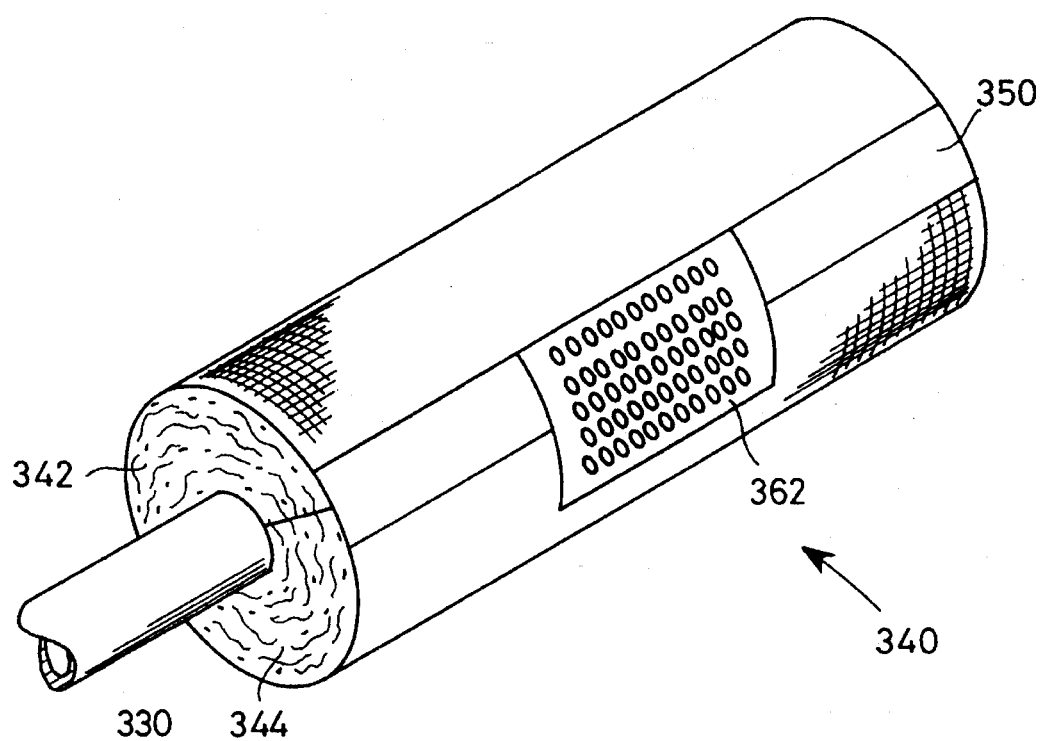
Figure 31:
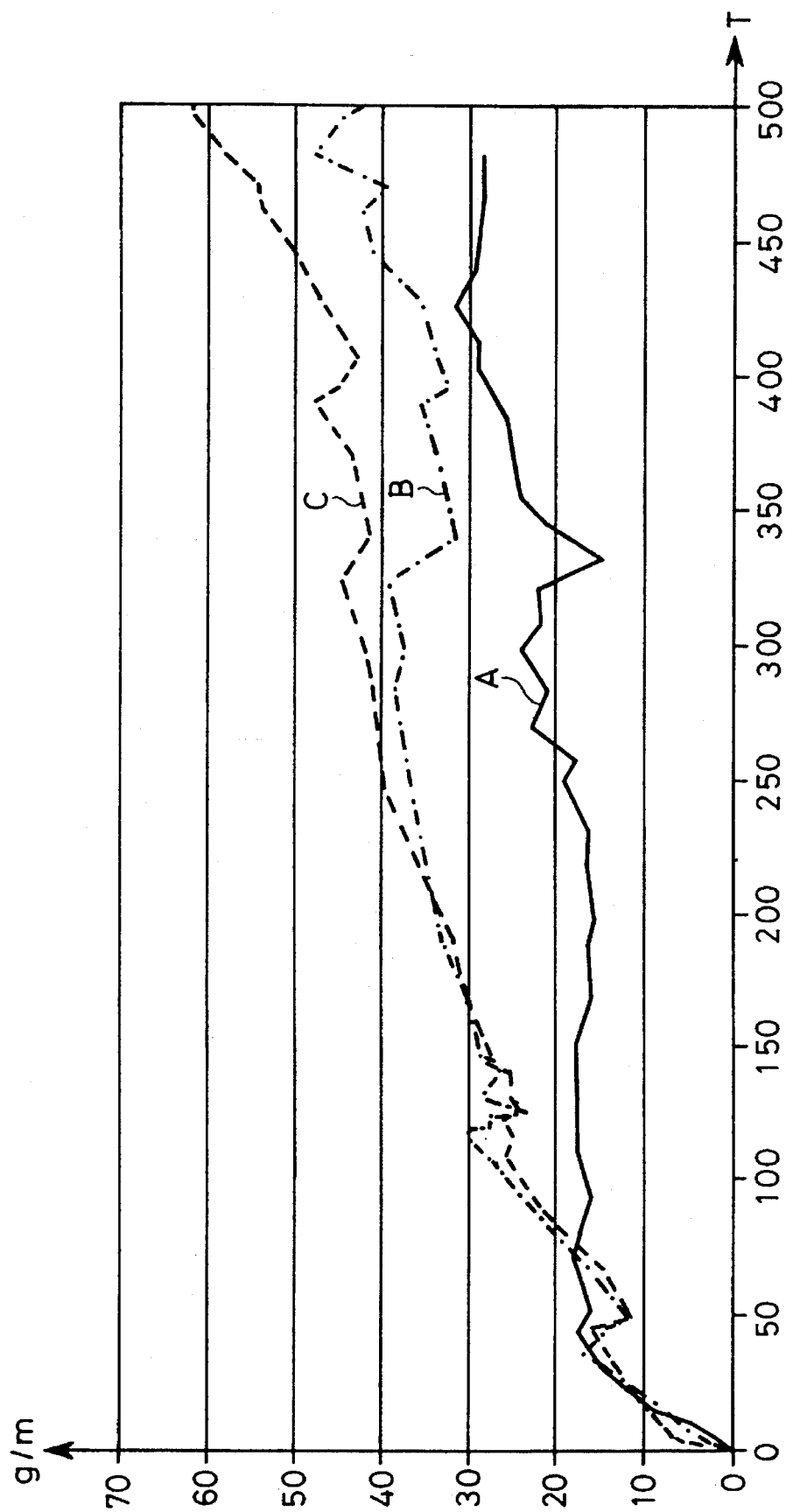

The present invention will now be further described with reference to the drawing, in which FIG. 1 is a perspective, schematic and sectional view of a pipe insulated by means of an annular insulating body provided with a first embodiment of a device according to the present invention for removing condensed water from the outer surface of the pipe, FIG. 2 is a perspective, schematic and sectional view similar to the view of FIG. 1 of a first embodiment of a heat-insulating assembly according to the present invention, comprising annular, cylindrical insulating segments and annular, disc-shaped water-removal elements, FIG. 3 is a perspective, schematic and sectional view similar to the view of FIG. 1 of a second embodiment of the device according to the present invention for removing condensed water from the outer surface of the pipe, also shown in FIGS. 1 and 2, FIG. 4 is a schematic and sectional view of a heat-insulating layer circumferentially encircling a pipe, the surface of which is drained in accordance with the teachings of the present invention, FIG. 5 is a vertical and sectional view of a second embodiment of the heat-insulating assembly according to the present invention circumferentially encircling a pipe, the surface of which is drained by means of angularly spaced-apart devices according to the present invention constituting integral elements of the heat-insulating assembly, FIG. 6 is a vertical and sectional view of the first embodiment of the device according to the present invention, also shown in FIG. 1, FIGS. 7a, 7b, 7c and 7d are schematic and sectional views of alternative embodiments of the device according to the present invention for removing condensed water, FIGS. 8 and 9 are perspective, schematic, and sectional view similar to the view of FIG. 1 illustrating a novel technique of renovating an existing heat-insulating assembly for removing condensed water from the outer surface of the pipe which is insulated by means of the heat-insulating assembly, FIGS. 10 and 11 are perspective, schematic, and sectional views similar to the view of FIG. 1 illustrating an alternative technique of renovating an existing heat-insulating assembly for removing condensed water from the outer surface of the pipe which is insulated by means of the heat-insulating assembly, FIG. 12 is a diagramme illustrating the effect of draining a heat-insulated pipe in accordance with the teachings of the present invention by employing a prototype implementation of the device according to the present invention for removing condensed water, FIG. 13 is a perspective, schematic and sectional view similar to the view of FIG. 1 of a pipe insulated by means of an annular insulating body made from foamed insulating plastics material provided with a first embodiment of the device according to the present invention for removing condensed water from the outer surface of the pipe, FIG. 14 is a vertical and sectional view similar to the view of FIG. 6 of the annular insulating body shown in FIG. 13 and of the first embodiment of the device according to the present invention, also shown in FIGS. 1, 6 and 13, FIG. 15 is a perspective, schematic and sectional view similar to the view of FIG. 2 of a slightly modified embodiment of the heat-insulating assembly according to the present invention as compared to the first embodiment shown in FIG. 2, FIGS. 16 and 17 are perspective, schematic and sectional views of further embodiments of the heat-insulating assembly according to the present invention, each comprising an annular, cylindrical insulating segment provided with a layer of a hygroscopic paint, FIGS. 18 and 19 are perspective, schematic and sectional views similar to the view of FIGS. 8 and 9 illustrating the technique of applying the embodiments of the heat-insulating assembly according to the present invention shown in FIGS. 16 and 17, FIGS. 20, 21 and 22 are perspective, schematic and sectional views similar to the view of FIGS. 16, 17, 18 and 19, respectively, of a further embodiment of the heat-insulating assembly according to the present invention, comprising annular, cylindrical insulating segments and a foil of a water transport allowing material and also illustrating the technique of mounting the annular, cylindrical insulating segments, FIG. 23 is a perspective and schematic view of a further preferred embodiment of a heat-insulating assembly to be used for insulating a pipe or a tubular body, and including a strip of a water transport-allowing material for the removal of condensed water from the outer surface of the pipe or tubular body, which is insulated by means of the heat-insulating assembly, FIGS. 24, 25, and 26 are perspective and schematic views similar to the view of FIG. 23, illustrating three steps of applying the heat-insulating assembly shown in FIG. 23 to a pipe, FIG. 27 is a perspective and schematic view similar to the view of FIG. 23 of a further embodiment of the heat-insulating assembly according to the present invention, FIGS. 28, 29 and 30 are perspective and schematic view similar to the view of FIGS. 24, 25, and 26, respectively, illustrating three steps of applying the heat-insulating assembly shown in FIG. 26 to a pipe, and FIG. 31 is a diagramatic view illustrating the effect of draining condensed water from a pipe insulated by means of the heat-insulating assembly according to the present invention, as compared to the effect of draining condensed water from the same pipes insulated by means of alternative heat-insulating assemblies.

In FIG. 1, a pipe 10 is shown, which pipe constitutes e.g. a cooling pipe of a freezing or refrigerator system or of an air-conditioning system, or a pipe supplying cold water. The pipe 10 serves the purpose of transmitting a fluid, which has a fairly low temperature, such as a cooling or freezing fluid or cold water. In order to prevent that the fluid transmitted though the pipe 10 is heated, the pipe 10 is provided with an outer insulating covering designated the reference numeral 12 in its entirety. The insulating covering 12 comprises basically an insulating body 14 constituted by a mineral wool body, such as a glass wool, rock wool or slag wool body of an annular configuration defining an inner cylindrical surface 16, which is arranged adjacent to or juxtaposed the outer cylindrical surface of the pipe 10, and further an outer cylindrical surface 18, which is provided with a water-transport blocking barrier or foil 18, such as an aluminum foil or a plastic foil, serving the purpose of reducing the amount of moisture penetrating into the insulating body 14 from the ambient air, which moisture is condensed at the cooled or cold outer surface of the pipe 10, resulting in the generation of condensed water at the outer surface of the pipe 10.

As is evident from FIG. 1, the insulating covering 12 is provided with a longitudinal cut 20 serving the purpose of allowing the annularly configurated insulating covering 12, to be arranged circumferentially encircling the pipe 10. For assembling the insulating covering 12 circumferentially encircling the pipe 10, an adhesive strip 22 is provided, which strip is a water-transport blocking strip or foil, e.g. constituted by an aluminum foil or a plastic foil. The adhesive strip 22 is applied bridging the longitudinal cut 20 of the insulating covering 12 for providing a sealed insulating covering 12 circumferentially encircling the pipe 10.

As the water-transport blocking barrier 18 does, however, not provide a hermetic sealing of the outer cylindrical surface of the insulating body 14, and as the adhesive tape or strip 22 may not provide a hermetic sealing of the longitudinal cut of the insulating covering 12, and as further the water-transport blocking barrier 19 and/or the adhesive strip 22 may be perforated unintentionally, moisture penetrates through the insulating body 14, resulting in the generation of condensed water at the outer surface of the pipe 10.

The generation of condensed water at the outer surface of the pipe 10 may, firstly, result in a reduction of the insulating property of the insulating covering 12, as the condensed water is absorbed by the material of the insulating body 14, increasing the heat transfer properties of the insulating body 14 and consequently reducing the insulating property of the insulating covering 12. Secondly, the condensed water may further cause corrosion and/or deterioration of the material of the pipe 10 and of the material of the insulating body 14.

As a hermetic sealing of the insulating covering 12 is not obtainable for tightly sealing the insulating body 14 relative to the ambient air, for preventing the penetration of moisture from the ambient air into the insulating body 14 and further to the outer surface of the pipe 10, a water-removal device is, in accordance with the teachings of the present invention, provided for removing condensed water which is inevitably generated at the outer surface of the pipe 10 from the outer surface of the pipe 10 to the outer cylindrical surface 18 of the insulating covering 12, from which outer surface the condensed water is caused to evaporate to the ambient air.

A first embodiment of a water-removal device according to the present invention implemented as a prototype implementation of the water-removal device is shown in FIG. 1, which first embodiment is designated the reference numeral 30. The first embodiment 30 of the water-removal device comprises a conduit component 32 of a tubular configuration defining a first or inner open end and a second or outer open end. The first end of the conduit component 32 is arranged adjacent to the outer surface of the pipe 10, whereas the outer end of the conduit 32 is connected to a flange component 34. Within the inner space defined within the conduit component 32, a water-transport-allowing material or water-absorbent material is arranged, which material further protrudes from the first end of the conduit component 32, as is shown in FIG. 1, which protruding material is designated the reference numeral 36. The material received within the conduit component 32 and constituting a filling of the inner space thereof communicates in liquid-transfer relationship at the second end of the conduit component 32 with a foil 38 of water-transport-allowing material or water-absorbent material.

As is evident from FIG. 1, the foil 38 is wrapped around the outer cylindrical surface of the insulating covering 12 and is at its liquid-transfer junction with the water-transport-allowing material, which is received within the inner space of the conduit component 32, covered by a covering plate 40. The foil 38 is consequently sandwiched between the outer surface of the flange component 34 and the inner surface of the covering plate 40. The outermost ends of the foil 38 are preferably fixated relative to the outer cylindrical surface of the insulating covering 12 by means of adhesive strips or adhesive glue. Alternatively, the outermost ends of the foil 38 may constitute flaps, which are freely exposed to the ambient air for causing evaporation of condensed water transmitted from the outer surface of the pipe 10 through the material received within the conduit component 32 and protruding from the first or inner end thereof, as designated by the reference numeral 36, to the foil material 38 through the liquid-transfer junction at the second end of the conduit component 32.

FIG. 6 is a vertical and sectional view of the pipe 10, the insulating covering 12 and the first embodiment 30 of the water-removal device according to the present invention.

From FIG. 6 it is evident that the material 36 protruding from the first end of the conduit component 32 is establishing contact with the outer surface of the pipe 10. FIG. 6 further illustrates a through-going bore 42 of the insulating covering 12, through which bore 42 the conduit component 32 of the first embodiment 30 extends from the outer cylindrical surface 18 of the insulating covering 12 to a position adjacent to, yet recessed relative to, the inner cylindrical surface 16 of the insulating covering 12.

From FIGS. 1 and 6 it is further evident that the insulating covering 12 does not provide a tight, circumferential sealing around the pipe 10, as a small interspace 44 is provided between the inner cylindrical surface 16 of the insulating covering 12 and the outer cylindrical surface of the pipe 10.

In FIG. 3, a perspective, schematic and sectional view similar to the view of FIG. 1 is shown, illustrating a second embodiment 50 of the water-removal device according to the present invention.

The second embodiment 50 of the water-removal device is like the first embodiment 30 of the water-removal device shown in FIG. 1, provided with the conduit component 32, which is received within a bore of the insulating covering 12, such as the bore 42 shown in FIG. 6. The water-transport-allowing material 36 protruding from the first end of the conduit component 32 is also shown in FIG. 3. The second end of the conduit component 32 is, similar to the first embodiment 30 shown in FIG. 1, connected to a flange component 52, which, however, differs from the flange component 34 shown in FIG. 1, in that it is of a structure integrally comprising a component similar to the covering plate 40 and provided with integral wing components 54, which are provided with windows 56, in which the foil material 38 is exposed. The flange component 52 and the wing components 54 together constitute a segment of a annular, cylindrical element defining an arc of the order of 240°, as is illustrated by dotted lines in FIG. 3. This structure allows the second embodiment 50 to be arranged as a clip-on structure, which is maintained in position by means of the wing components 54, which encircle approximately 240° of the outer cylindrical surface 18 of the insulating covering 12. Consequently, the embodiment 50 is maintained in position by means of the wings 54 and need no additional fixation, such as additional adhesive foils, adhesive strips or adhesive glue. Additional fixation by means of adhesive foils, adhesive strips or adhesive glue, may, however, be used if desired.

In FIG. 4, a schematic and sectional view, illustrating the technique of draining an outer surface of a pipe which is insulated by means of a heat-insulating assembly circumferentially encircling the pipe, is shown.

According to the teachings of the present invention, the insulating covering 12 circumferentially encircling the pipe 10 and comprising the insulating body 14 defining the inner cylindrical surface 16 and the outer cylindrical surface 18, at which the material-diffusion blocking barrier or foil 18 is provided, is provided with a plurality of bores 42, in which water-removal devices constituted by water-removal devices implemented by the first embodiment 30 shown in FIGS. 1 and 6 are received. As is evident from FIG. 4, the water-removal devices are preferably arranged at the lowermost position of the pipe 10, as, due to the gravitational force, any condensed water is caused to be accumulated at the lower side surface of the pipe 10. Therefore, a maximum water-removal effect is obtained provided the water-removal devices implemented in accordance with the teachings of the present invention are provided at the lowermost positions of the insulating covering 12 and extend to positions adjacent to the lower side surface of the pipe 10.

According to a particular aspect of the present invention, the water-removal device implemented in accordance with the teachings of the present invention may be incorporated into the insulating body circumferentially encircling the tube to be insulated by means of the insulating body.

In FIG. 2, a heat-insulating assembly according to the present invention is shown, in which annular disc-shaped water-removal elements constituting water-removal devices are incorporated. The pipe 10 is provided with an insulating covering composed of a plurality of annular, cylindrical insulating coverings 62, each comprising an insulating body 64 similar to the insulating body 14 shown in FIGS. 1, 3 and 6, each of which insulating bodies defines an inner cylindrical surface arranged adjacent to or juxtaposed the outer cylindrical surface of the pipe 10 and an outer cylindrical surface together defining an overall outer cylindrical surface 68 of the heat-insulating assembly. A solid line 66 defines a line of separation between two adjacent segments 62.

Two disc-shaped water-removal elements 70 constituted by annular discs of water-transport-allowing material are also shown in FIG. 2. The annular disc-shaped water-removal elements define an inner diameter, which is substantially equal to, still slightly smaller than the outer diameter of the pipe 10, and an outer diameter, which is larger than the outer diameter of the outer cylindrical surface 68. Consequently, the water-removal elements 70 each provides a tight fit around the outer cylindrical surface of the pipe 10 establishing a line contact between each of the elements 70 and the outer cylindrical surface of the pipe 10. Further, each of the water-removal elements 70 provides a rim part protruding outwardly from the outer cylindrical surface 68 and defining an evaporation surface, from which condensed water transferred from the outer cylindrical surface of the pipe 10 and through the water-transport-allowing material of the water-removal element 70 in question is caused to evaporate, as the outwardly protruding rim segment of the water-removal element 70 in question is exposed to the ambient air.

The outwardly protruding rim parts of the water-removal elements 70 may be taped to the outer cylindrical surface 68 of the insulating covering by means of a water-transparent tape or perforated tape or alternatively and preferably by means of a non-water-transparent tape, e.g. a perforated tape, which, however, provides uncovered parts of the outwardly protruding rim parts which uncovered parts are arranged bend along the outer cylindrical surface 68 of the insulating covering. The non-water transparent tape may further serve the purpose of sealing the separation between any two adjacent segments 62 of the insulating covering for preventing that water to any substartial extent penetrates into the separation or spacing between the two segments.

In FIG. 5, a second or alternative embodiment of the heat-insulating assembly according to the present invention, comprising integral water-removal devices implemented in accordance with the teachings of the present invention, is shown.

In FIG. 5, the pipe 10 is circumferentially encircled by the insulating covering 12, in which angularly spaced-apart, through-going bores 41, 42 and 43 are provided. Within each of the bores 41, 42 and 43, a water-removal device implemented by the first embodiment 30 of the water-removal device according to the present invention, shown in FIGS. 1 and 6, is received. Contrary to the embodiment shown in FIG. 1 or in FIG. 6, the water-removal devices 30 shown in FIG. 5 are, however, fixated relative to the insulating covering 12, constituting integral components of a heat-insulating assembly provided with integral water-removal devices. Whereas the embodiment of the heat-insulating assembly shown in FIG. 5 is readily adaptable to insulating pipes, such as cold-water pipes or pipes through which e.g. a cooling or freezing fluid is transferred, the water-removal device constituting a separate element as disclosed in FIGS. 1, 3 and 6 and is readily adaptable to new installations or applications as well as renovation applications, i.e. applications by which an existing insulating covering is to be drained in accordance with the teachings of the present invention.

The first embodiment 30 of the water-removal device according to the present invention discussed above with reference to FIGS. 1, 3, 4, 5 and 6 may be implemented in accordance with various fixation and application techniques. These alternative techniques are illustrated in FIGS. 7a, 7b, 7c and 7d.

In FIG. 7a, the conduit component of the water-removal device is constituted by a cylindrical tubular element 72, which defines a first open end, from which the material 36 protrudes, and an opposite, second open end, at which a flange component 74 is provided, which flange component serves the same purpose as the above-described flange components 34 and 52. The flange component 74 supports the foil 38 at an outer supporting surface thereof and is provided with an adhesive coating 76 at the opposite surface of the flange component, which surface is to be arranged in facial contact with the outer surface of the insulating covering, in which the water-removal device 30 is to be embedded.

The water-removal device 30 shown in FIG. 7b differs from the water-removal device shown in FIG. 7a in that the cylindrical, tubular element 72 shown in FIG. 7b is substituted by a conical, tubular element 78 similar to the conduit component 32 discussed above. The water-removal device shown in FIG. 7b is also to be fixated relative to the insulating covering, in which the water-removal device is to be received and embedded, and provided with the adhesive coating 76.

In FIGS. 7c, the adhesive coating 76 is omitted, whereas the conical, tubular element 78 is provided with outwardly protruding bards 80 serving the purpose of fixating the water-removal device 30 as the water-removal device 30 is introduced into a bore or aperture of the insulating covering, in which the water-removal device is to be received.

The embodiments shown in FIGS. 7a, 7b and 7c of the water-removal device according to the present invention are to be introduced into a previously prepared bore or aperture of the insulating covering, in which the water-removal device is to be received.

In FIG. 7d, the water-removal device 30 shown in FIG. 7c is further modified by the addition of a perforating pin 82, which extends through the innerspace of the conical, tubular element 78 and projects from the first open end thereof together with the material 36. The perforating pin 82 is provided with a head 84, which is separable from the main body of the perforating pin 82 along a weakening line at the first open end of the conical, tubular element. The embodiment of the water-removal device 30 shown in FIG. 7d is, consequently, readily applicable in connection with an insulating covering. The insulating covering need not be prepared for the introduction of the water-removal device, as the water-removal device is simply forced into the insulating covering as the perforating pin 82 and the head thereof perforate the insulating covering. As the head of the perforating pin contacts the outer cylindrical surface of the pipe or tube, adjacent to which the water-removal device is to be arranged, the head is broken from the main body of the perforating pin 82 along the above-mentioned weakening line, allowing the water-removal device to be forced into its intentional end position, in which the flange component 74 is brought into facial contact with the adjacent outer surface of the insulating covering.

In FIGS. 8 and 9, a novel technique of removing condensed water from the outer surface of the pipe 10 is disclosed. According to the technique disclosed in FIGS. 8 and 9, a rod 90 of a water-transport-allowing material, or preferably a capillary suction material is introduced into a through-going passage 86 extending through the insulating body 14 of the insulating covering 12 from the outer cylindrical surface 18 of the insulating covering 12 to the vicinity of the outer surface of the pipe 10. The rod 90 is preferably arranged in direct contact with the outer surface of the pipe 10. After the rod 90 has been introduced into the through-going passage 86 establishing direct contact with the outer surface of the pipe 10, the rod is cut off at the outer cylindrical surface 18 of the insulating covering 12, providing a free piece of the rod, which piece is shown in FIG. 9 and designated the reference numeral 88.

After the rod 90 has been cut off and shortened, providing a filling of the through-going passage 86, which filling serves the same purpose as the filling of the conduit component 32 of the first embodiment 30 of the device according to the present invention shown in FIG. 1, a foil 92 of water-transport-allowing material is wound round the insulating covering 12, establishing contact with the rod 90 so as to allow transfer of condensed water from the rod 90 to the foil 92 which serves the purpose as an evaporator body for evaporating the condensed water transferred to the foil 92 to the ambient air. The foil 92 is fixated relative to the insulating covering 92 by means of an adhesive tape 94. In FIG. 9, the foil 92 is arranged defining an overlap, however, the foil 92 may constitute a segment covering a part of the outer cylindrical surface 18 of the insulating covering 12, exclusively.

In FIGS. 10 and 11, an alternative technique of removing condensed water from the outer cylindrical surface of the pipe 10 is disclosed. In FIG. 10, the insulating covering is divided into two segments 62 similar to the segments 62 shown in FIG. 2, which segments, however, may be provided by cutting the insulating covering 12 shown e.g. in FIGS. 1, 3, 8, and 9 along a radial slit providing a through-going slit from the outer cylindrical surface of the insulating covering to the inner cylindrical surface of the insulating covering, which inner cylindrical surface is arranged juxtaposed the outer surface of the pipe 10. After the slit which is designated the reference numeral 66 has been provided, a lead or cord of a water-transport-allowing material is forced into the circumferential and through-going slit 66 providing a winding 96 encircling the outer surface of the pipe 10 and an outwardly protruding free end 98 of the lead or cord. The lead or cord, comprising the winding 96 and the outwardly protruding free end 98, constitutes a water transport means similar to the rod 90 shown in FIGS. 8 and 9 and the filling of the conduit component 30 of the first device 30 shown in FIG. 1.

After the lead or cord has been arranged encircling the outer surface of the pipe 10 providing an outwardly protruding free end of the lead or rod, the evaporator foil 92 also shown in FIGS. 8 and 9 is arranged encircling the outer surface of the insulating body comprising the segments 62 and establishing contact with the lead or rod, the free end 98 of which projects or protrudes freely from the circumferential rim of the foil 92 as shown in FIG. 11. The free end 98 of the lead or cord may in itself constitute an evaporator for evaporating condensed water transferred from the outer surface of the pipe 10 through the winding 96 to the free end, however, preferably communicates with the foil 92 which serves the purpose of providing an enlarged evaporator surface as compared to the evaporator surface of the free end 98 of the lead or cord.

In FIG. 12, a diagramme is shown, illustrating the water-removal capability of the water-removal technique according to the present invention. A solid line curve illustrates the amount of water, as expressed in gram, which is accumulated within a mineral wool-insulating layer arranged circumferentially encircling a pipe, through which cold water is transferred, and which is provided with an outer aluminum foil coating, from the day of applying the insulation to the pipe. A dotted line curve similarly illustrates the amount of water accumulated within a foamed insulating layer applied to the very same pipe. After 367 days of application, a water-removal device constituted by a prototype implementation of the water-removal device according to the present invention, as shown in FIGS. 1 and 6, was introduced into the mineral wool-insulating layer, resulting in a reduction of the amount of accumulated water from approximately 72 g to approximately 32 g after approximately 45 days. After the water-removal device had been applied, the amount of water accumulated within the mineral wool-insulating layer was reduced as compared to the amount of water accumulated within the foamed insulating layer.

In FIG. 13, an alternative application of the first embodiment of the water-removal device according to the present invention described above with reference to FIGS. 1, 4, 5, and 6 is illustrated. In FIG. 13, the pipe 10 is insulated by means of a two-layer foamed insulating covering 112 defining an outer cylindrical surface 118 and an inner cylindrical surface 116 which is arranged adjacent to or juxtaposed to the cylindrical surface of the pipe 10. The two-layer foam 2 insulating covering 112 comprises an outer insulating foamed layer 114 and an inner insulating foamed layer 115 which are separated relative to one another along a separating surface defining a line of separation 113 shown in FIG.

13. The two-layer foamed insulating covering 112 may further be provided with an outer protective and water-transport blocking barrier or foil provided at the outer cylindrical surface 118 and an inner water-transport blocking barrier or foil provided at the inner cylindrical surface 116. Basically, the two-layer foamed insulating covering 112 serves the same purpose as the insulating covering 12 discussed above with reference to FIG. 1. Similar to the insulating covering 12 described above, the two-layer foamed insulating covering 112 is provided with a longitudinal cut 120 allowing the two-layer foamed insulating covering 112 to be arranged circumferentially encircling the pipe 10. Instead of the adhesive strip 22 of the insulating covering 12 discussed above, the two-layer foamed insulating covering 112 is provided with two locking components 122 and 124 which are locked together in a seal 126 of a zipper-like configuration. Alternatively, burr-like sealing strips or adhesive sealing strips may be provided for assembling the two-layer foamed insulating covering 112 circumferentially encircling the pipe 10.

In FIG. 14, a vertical sectional view thru the two-layer foamed insulating covering 112 and pipe 10 is shown further disclosing the interspace 44 also discussed above with reference to FIG. 6 which interspace is defined between the inner cylindrical surface 116 of the two-layer foamed insulating covering 112 and the outer cylindrical surface of the pipe 10. The first embodiment of the water-removal device 30 according to the present invention is as is evident from FIGS. 13 and 14 arranged in a through-going bore or aperture 119 of the two-layer foamed insulating covering 112 and arranged so as to provide water-transport communication through the material 36 establishing contact with the outer cylindrical surface of the pipe 10 to the water-evaporation foil 38 of the device 30. It is to be realized that the above described two-layer foamed insulating covering 112 may be substituted by a single layer foamed insulating covering which may further constitute an integral body which is not provided with any inner or outer protective and water-transport blocking barriers. The foamed insulating covering being a single layer, a two-layer or a multilayer structure may comprise closed cells or open cells. Further, the above-described two-layer foamed insulating covering 112 may at the interspace between the two foamed layers 114 and 115 be provided with a water-transport blocking barrier or foil.

It is believed that a difference exists between the insulating covering 12 made from mineral wool and the insulating covering 112 made from foamed material as moisture penetrating thru the insulating covering and condensed at the outer cylindrical surface of the pipe, is mainly accumulated at the outer cylindrical surface of the pipe provided the insulating covering is made from mineral wool, whereas moisture is condensed within the foamed material irrespective of whether or not the foamed material comprise closed cells or open cells of foamed material. Although this minor difference exists between mineral wool insulating coverings and foamed insulating coverings, the water-removal concept according to the present invention implemented e.g. by means of the prototype implementation of the device 30 discussed above, renders it possible to eliminate or drain condensed water from the outer surface of the pipe provided the insulating covering is made from mineral wool and from the outer surface of the pipe and also from an inner layer of the insulating covering provided the insulating covering is made from foamed material.

In FIG. 15, a slightly modified embodiment of the heat-insulating assembly according to the present invention described above with reference to FIG. 2 is shown. The embodiment shown in FIG. 15 differs from the embodiment shown in FIG. 2 in that the disc-shaped water removal elements 70 each defines an inner diameter which is somewhat smaller than the outer diameter of the pipe 10. Consequently, the water removal elements 70 each defines a turned end part 71 which is arranged in facial contact with the outer cylindrical surface of the pipe 10. By the provision of the turned end parts 71, a tight fit of the elements 70 around the pipe 10 is established.

In FIG. 16 a further embodiment of the heat-insulating assembly according to the present invention is shown designated the reference numeral 130 in its entirety. The embodiment shown in FIG. 16 constitutes a segment of an annular, cylindrical insulating covering to be arranged circumferentially encirling a pipe as will be described in greater details below with reference to FIGS. 18 and 19. The embodiment 130 comprises an annular, cylindrical segment of an insulating body 132 defining an inner cylindrical surface 134 to be arranged adjacent to or juxtaposed the cylindrical surface of the above-mentioned pipe and defining an outer cylindrical surface 136. The outer cylindrical surface is covered by a water-barrier foil. The insulating body 132 defines an annular end surface which is covered by a layer 138 of a hygroscopic paint which constitutes a means for transport of water from the outer cylindrical surface or the pipe on which the segment 130 is arranged in accordance with the teachings of the present invention. At the outer cylindrical surface 136, a further layer 140 of the hygroscopic paint is applied for providing a means for evaporation of water transferred to the layer 140 through the layer 138. The layer 138 provides a line contact with a part of the outer cylindrical surface of the pipe on which the segment 130 is arranged.

In FIG. 17, a slightly modified embodiment is compared to the embodiment described above with reference to FIG. 16 of the heat-insulating assembly is shown designated the reference numeral 130' in its entirety. The embodiment 130' differs from the above described embodiment 130 in that an additional layer 142 of the hygroscopic paint is applied at the inner cylindrical surface 134 of the insulating body 132. The additional layer 142 is provided for establishing a surface contact with the outer cylindrical surface of the above-mentioned pipe on which the segment 130' is arranged.

The layers 138 and 140 and optionally the additional layer 142 are preferably applied in a single paint application step by spraying or transferring a hygroscopic paint to the insulating body 132 by means of an applicator of any appropriate structure. Provided all three layers 138, 140 and 142 of the hygroscopic paint are provided, the layers 138, 140 and 142 may simply be provided by partly immersing one end of the insulating body 132 into the hygroscopic paint from which the layers 138, 140 and 142 are provided.

In FIG. 18 the segment 130 is arranged encircling the above-described tube 10 together with an additional segment 230 which may be of a structure identical to the structure of the segment 130. The segment 230 defines an ounter cylindrical surface 236 which corresponds to the outer cylindrical surface 156 of the segment 130 and which is provided with a layer 240 of the hygroscopic paint similar to the layer 140 of the layer 130. The segments 130 and 230 are preferably arranged closely adjacent one another in order to eliminate that a gap is established between the annular end surfaces of the segments 130 and 230.

In FIG. 19 a junction between the segments 130 and 230 is sealed by means of a tape constituting a vapor-barrier foil which is provided with partly exposing the layer 240 of the hygroscopic paint of the segment. As is evident from FIG. 19, the tape 144 is a tape composed of two parts one of which is provided with perforations arranged partly exposing the layer 240 of the hygroscopic paint and one of which is arranged sealing the junction between the segments 130 and 230 preventing that vapor or liquid may permeate into the space inevitably provided between the annular end surfaces of the segments 130 and 230 which end surfaces are arranged juxtaposed one another.

The embodiments 130 and 130' may be modified in that the outer vapor-barrier foil 136 may also be applied to the annular end surfaces of the insulating body 132 providing a vapor-barrier closure of the annular end surfaces. In FIG. 16 and 17, only one of the annular end surfaces of the annular cylindrical insulating bodies is provided with a layer of the hygroscopic paint communicating with the outer and optionally the inner layers of the hygroscopic paints. Alternatively, the hygroscopic paint or any other water-transport-allowing material may be applied at both end surfaces of the insulating body of the heat-insulating assembly.

Figure 20:
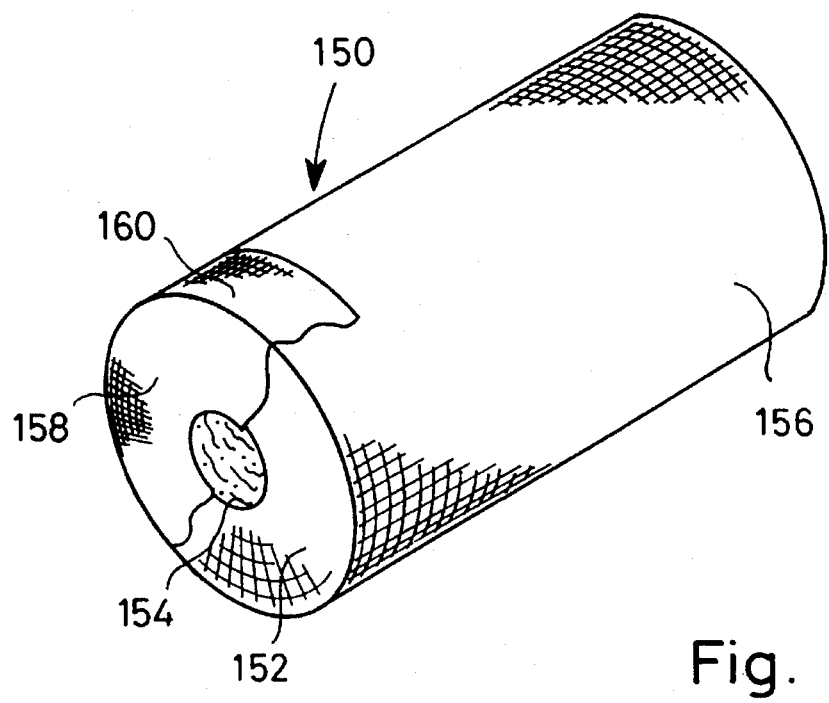

In FIG. 20, a further embodiment of the heat-insulating assembly according to the present invention is shown, designated the reference numeral 150 in its entirety. The embodiment 150 constitutes a segment similar to the segments 130 and 130' described above with reference to FIGS. 16 and 17, however, differing from the above described embodiments 130 and 130' in that the annular end surfaces of the annular cylindrical insulating body of the embodiment is covered by a vapor-barrier foil 152 which is integrally connected to an outer circumferential encircling vapor-barrier foil similar to the foil 136 and designated the reference numeral 156. The annular cylindrical insulating body defines an outer cylindrical surface and an inner cylindrical surface 154. At one of the annular end surfaces of the segment 150, a water-transport-allowing foil 158 is applied, which foil is integrally connected to a foil layer 160 provided at the outer cylindrical surface 156 of the segment 150.

Figure 21:
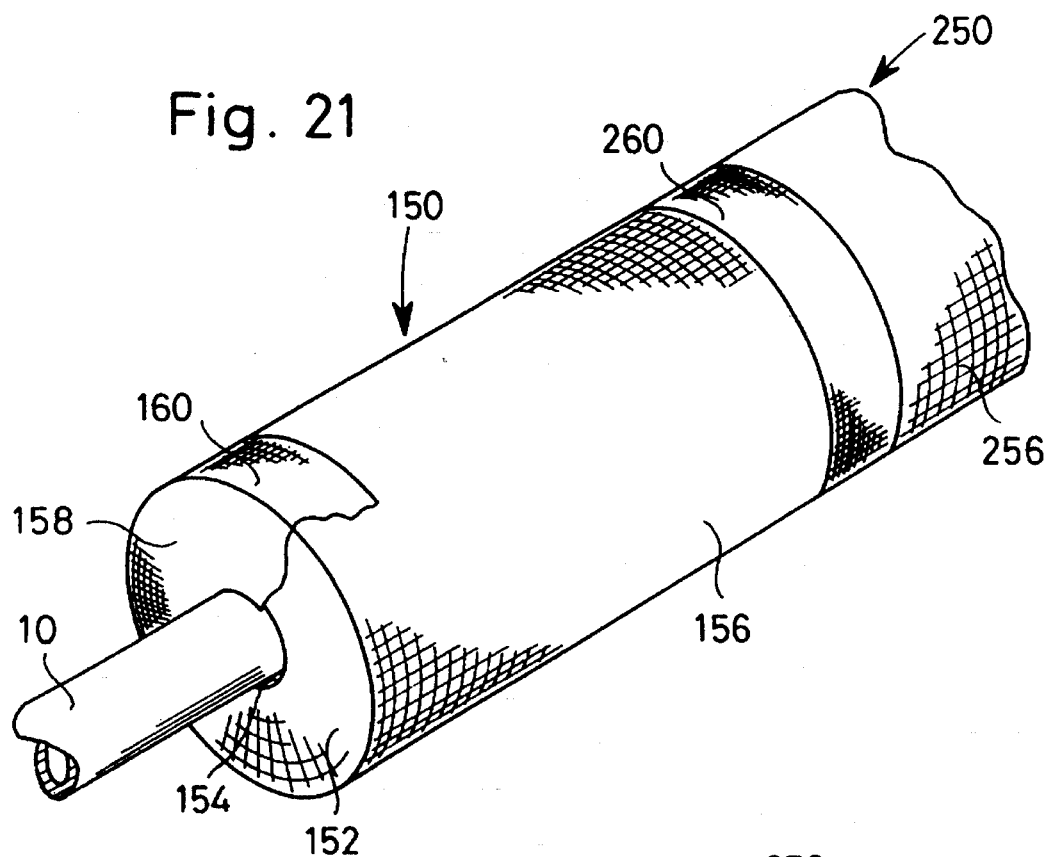
Figure 22:
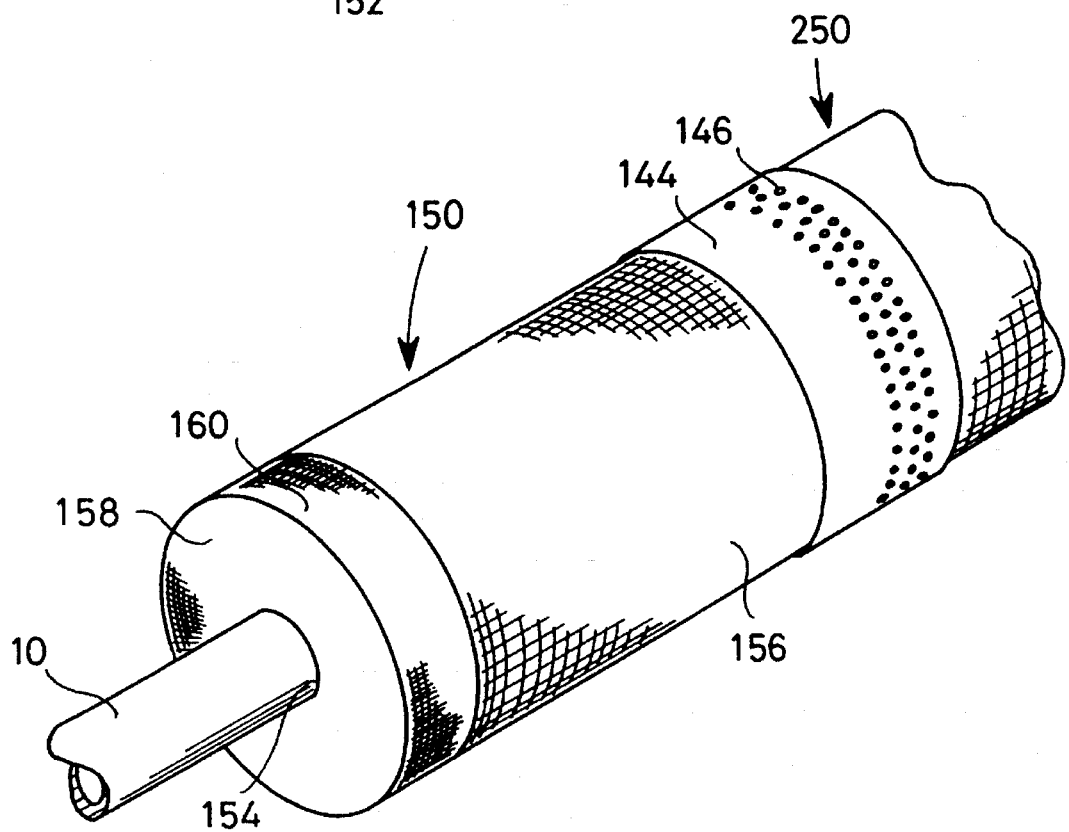

In FIG. 21, the segment 150 is arranged on the pipe 10 described above along with a further segment 250 which may be of a structure identical to the structure of the segment 150 and defines an outer cylindrical surface 256 similar to the surface 156 of the segment 150. A foil 260 of the segment 260 constitutes an evaporator similar to the foil 160 of the segment 150.

The segments 150 and 250 are, like the above described segments 130 and 230, as shown in FIG. 19 preferably provided with a sealing constituted by the above described tape 144 provided with the perforations 146 which are arranged partly exposing the foil 260 in order to allow that water may evaporate from the evaporator 260.

In FIG. 23, a further preferred embodiment of a heat-insulating assembly according to the present invention is shown, designated the reference numeral 310 in its entirety. The heat-insulating assembly 310 basically comprises an annular heat-insulating body constituted by a mineral wool body, such as a glass wool, rock wool or slag wool body composed of basically two segments 312 and 314, together constituting the annular heat-insulating body to be arranged circumferentially encircling a tubular body, such as a pipe, as will be described in greater details below with reference to FIGS. 24–26. The segments 312 and 314 are produced from an annular integral body which is cut lengthwise along a rectilinear slit producing two surfaces 311 and 315 to be contacted with one another as the segments 312 and 314 are positioned circumferentially encircling the above-mentioned tubular body. The segments 312 and 314 are further separated from one another through a partial slit 313 extending partly into the wall of the annular heat-insulating body. The slit 313 is preferably produced in the same cutting operation, in which the slit producing the surfaces 311 and 313 is also produced.

The annular heat-insulating body comprising the segments 312 and 314 defines an inner surface, designated the reference numeral 317, which inner surface in the intentional application of the assembly 310 is arranged juxtaposed the outer surface of the above-mentioned tubular body. The annular heat-insulating body comprising the segments 312 and 314 also defines an outer surface contituting an outer cylindrical surface, as the heat-insulating body comprising the segments 312 and 314 is arranged circumferentially encircling the above-mentioned tubular body. The outer surface of the heat-insulating body is completely covered by an aluminium foil 316, which serves the purpose of providing a vapour and water barrier preventing the vapour and water from permeating into the heat-insulating material of the segments 312 and 314 of the heat-insulating body. The aluminium covering or foil 316 also comprises a flap 322, which protrudes beyond the surface 311 of the segment 312 and which is provided with an adhesive layer, e.g. an adhesive tape 318, provided with a release paper 320 and serving the purpose of adhering the flap 322 to the aluminium foil 316 at the surface 315 in overlapping relation.

The heat-insulating assembly 310 further comprises a strip 324 of a water transport-allowing material, such as a capillary suction material, which strip is of a width substantially smaller than the overall length of the heat-insulating body comprising the segments 312 and 314. The strip 324 is, through an end flap 326, adhered to the outer surface of the aluminium covering 316 at a position adjacent to the surface 315.

FIGS. 24–26 illustrate three steps of arranging the heat-insulating assembly 310 relative to a tubular body constituted by a pipe 330, which e.g. constitutes a cooling pipe of a freezing or refrigerator system or of an air-conditioning system, or a pipe supplying cold water. Thus, the pipe 330, in most instances, serves the purpose of transmitting a fluid, which has a fairly low temperature, at least a temperature which is somewhat lower than the temperature of the ambient air. The fluid may e.g. constitute a cooling or freezing fluid, or cold water. Alternatively, the pipe 330 may constitute a pipe of the type described in the above-mentioned article.

In order to prevent that the fluid transmitted through the pipe 330 is heated, provided the fluid is a freezing or cooling fluid, the heat-insulating assembly 310 is applied. Initially, the free end of the strip 324 is positioned within the through-shaped inner space defined within the segments 312 and 314 of the heat-insulating body of the heat-insulating assembly 310. Thereafter, the segments 312 and 314 are separated from one another so as to allow the heat-insulating assembly 310 to be positioned circumferentially encircling the outer surface of the pipe 330. The heat-insulating assembly 310 is positioned circumferentially encircling the pipe 330 so as to cause said strip 324 to contact the outer surface of the pipe 330 for establishing facial contact between the strip 324 and the outer surface of the pipe 330, and further, as is evident from FIG. 24, for presenting a flap 328 extending freely out through the slit defined between the surfaces 311 and 313.

In the step shown in FIG. 25, the segments 312 and 314 are pressed firmly against one another, causing the surfaces 311 and 313 of the segments 312 and 314, respectively, to contact one another, and also causing the slit 313 to be closed. Thereupon, the adhesive tape 318 of the flap 322 is contacted with the outer surface of the aluminium foil 316 of the segment 314 adjacent to the above-mentioned slit defined between the surfaces 311 and 313 for sealing the slit, after the release paper 320 initially covering the adhesive material of the adhesive tape 320 is removed. As the flap 322 is contacted in overlapping relationship with the aluminium foil 316 of the segment 314 adjacent to the above-mentioned slit, the flap 328 of the strip 324 is exposed in a position overlapping the flap 326.

Finally, as shown in FIG. 26, a perforated adhesive foil 32 is positioned covering the flaps 326 and 328, still presenting exposed areas of the flap 328 to the ambient air through the perforations of the tape 32.

In FIG. 27, a further embodiment of the heat-insulating assembly according to the present invention is shown, designated the reference numeral 340 in its entirety. The embodiment 340 differs from the above-described embodiment 310 in that the embodiment is composed of a plurality of separate components, whereas the embodiment 310 is a unitary structure to be arranged circumferentially encircling the pipe 330 without the use of additional components apart from the perforated tape 32.

The embodiment 340 comprises two segments 342 and 344 of an annular heat-insulating body similar to the segments 312 and 314, respectively, described above. The segments 342 and 344 present surfaces 341 and 345 similar to the surfaces 311 and 315, respectively, described above, and are further separated through a partial slit 343 similar to the slit 313 described above. The annular heat-insulating body comprising the segments 342 and 344 presents an inner surface 347 and an outer surface, which is covered by a vapour- and water-impermeable covering 346, such as an aluminium foil.

Whereas the aluminium foil 316 of the embodiment 310 provided a flap 322, the covering 346 solely covers the outer surface of the segments 342 and 344 of the annular heat-insulating body without producing any flap. Also, the strip 324 of the embodiment 310, described above with reference to FIGS. 23–26, is, in the embodiment 340, substituted by a separate strip 354 of a somewhat larger width. The assembly 340 further comprises a length of an adhesive tape 350 provided with a release paper 352.

The heat-insulating assembly 340 is arranged in accordance with the technique disclosed in FIGS. 28–30. Initially, the strip 354 is positioned circumferentially encircling the outer surface of the pipe 330 or, alternatively, positioned within the through-shaped inner space defined within the heat-insulating body comprising the segments 342 and 344, whereupon the heat-insulating body is positioned circumferentially encircling the outer surface of the pipe 330. As is evident from FIG. 28, the strip 354 presents two flaps 356 and 358 extending out through the slit extending lengthwise through the annular heat-insulating body comprising the segments 342 and 344 and defining the surfaces 341 and 345.

Thereupon, the segments 342 and 344, as is evident from FIG. 29, are pressed firmly against the outer surface of pipe 330 in a step similar to the step described with reference to FIG. 25 for contacting the surfaces 341 and 345 with one another, and for closing the slit 343. Similar to the technique described above with reference to FIG. 25, the adhesive tape 350 is subsequently applied to the outer surface of the covering 346 for sealing the slit defined between the surfaces 341 and 345, and further for maintaining the heat-insulating assembly 340 in the intentional position shown in FIG. 29. As is evident from FIG. 29, the outer flaps 356 and 358 of the strip 354 are exposed to the ambient air at the outer surface of the covering 346.

In a final step, shown in FIG. 30, a perforated tape 362 similar to the tape 32 is applied to the outer surface of the covering 346 and also covering the flaps 356 and 358, still presenting areas of the flap 358 to the ambient air through the perforations of the perforated tape 362.

The strips 314 and 354 of the above-described embodiments 310 and 340, respectively, serve the purpose of draining condensed water from the outer surface of the pipe 330, as the coverings 316 and 346 are not able to provide hermetic sealing of the annular heat-insulating body relative to the environment and the ambient air. Therefore, moisture or water may permeate through the heat-insulating material of the annular heat-insulating body of the heat-insulating assembly, causing the degeneration of condensed water at the outer surface of the pipe 330.

The degeneration of condensed water at the outer surface of the pipe 330 may, firstly, dependent on the properties and the specific material of the annular heat-insulating body, result in the reduction of the insulating property of the annular heat-insulating body, as the condensed water may, in some instances, be absorbed by the material of the annular heat-insulating body and produce an increase of the heat-transport properties of the material of the annular heat-insulating body, and consequently reduce the insulating property of the heat-insulating assembly. Secondly, the condensed water may cause corrosion and/or deterioration of the pipe 330 and, in some instances, also of the material of the annular heat-insulating body of the heat-insulating assembly. For draining any condensed water from the outer surface of the pipe 330, the strips 314 and 354 are provided in accordance with the teachings of the present invention.

The strips 324 and 354 serve three purposes: firstly, the purpose of contacting a surface area of the outer surface of the pipe 330, which area is preferably an area positioned at a minimum height above ground level, secondly, the purpose of conducting condensed water from the part of the strip contacting the outer surface of the pipe to the flaps exposed at the outer surface of the vapour and water barrier of the heat-insulating assembly, and, thirdly, the purpose of causing condensed water to evaporate from the flaps exposed to the ambient air.

Contrary to the prior art condensed-water draining technique, the heat-insulating assembly according to the present invention comprises a fairly small strip of water transport-allowing material, since it has been realized that the prior art technical solution, as described in the above-mentioned international patent application, does not function entirely satisfactory. Thus, it has been realized that the draining and evaporation properties of the prior art structures are somewhat inadequate, since the water transport-allowing material of the prior art structures, which material covers the overall surface of the pipe insulated by means of the prior art structures, has to be completely soaked with water before any evaporation of condensed water from the exposed part of the water transport-allowing material is generated. Thus, the prior art structures unintentionally accumulate a fairly large amount of water, which inadvertently influences the operation and properties of the prior art structures.

The above realization is illustrated in FIG. 31, which presents a diagramme illustrating three curves: A, B, and C. The curve A illustrates the amount of water accumulated within a heat-insulating assembly implemented in accordance with the above-described embodiment 310, which assembly was arranged circumferentially encircling a pipe, through which cold water was transferred. The amount of water accumulated per 1 g of the heat-insulating assembly was determined periodically within a time period of 540 days represented along the abscissa axis of the diagramme. The curve B similarly illustrates the amount of water accumulated per 1 m of a heat-insulating structure of the type described in the above-mentioned international patent application and applied to the very same pipe as the heat-insulating assembly implemented in accordance with the teachings of the present invention. The curve C similarly illustrates the amount of water accumulated per 1 m of a foamed insulating layer of the type Armaflex™, and also applied to the very same pipe as the heat-insulating assembly implemented in accordance with the teachings of the present invention and the heat-insulating structure according to the above-mentioned international patent application.

From FIG. 31, it is evident that the heat-insulating assembly implemented in accordance with the teachings of the present invention, so to speak, starts functioning after approximately 40–50 days, as the amount of water accumulated within the heat-insulating assembly is fairly constant from that time until the end of the test or experiment after 500 days. The heat-insulating structure according to the above-mentioned international patent application, like the foamed insulating structure, constantly increases the amount of water accumulated within the structures for approximately 200 days, whereupon the heat-insulating structure according to the above-mentioned international patent application starts draining a fairly small amount of water from the pipe, whereas the Armaflex™ heat-insulating structure still increases the amount of water accumulated within the heat-insulating structure.

EXAMPLE 1

A prototype implementation of the water-removal device according to the present invention as shown in FIGS. 1 and 6 was made from the following components: The conduit component 32 was constituted by a tubular segment of a PVC tube of a length of 18 mm having an outer diameter of 12 mm and an inner diameter of 8 mm. The flange component 34 was cast from PVC of a thickness of approximately 2 mm and measured 30 mm×30 mm. The water-transport-allowing material received within the conduit component 32 was constituted by approximately 1 g of the viscose-based non-woven material. The foil 38 was made from the same water-transport-allowing material as the conduit component 32 of an amount of approximately 1–2 g and measuring 30 mm×100 mm.

EXAMPLE 2

In the above described embodiments and in accordance with the above described techniques, the water-transport-allowing material which is preferably a capillary suction material may be provided from any material fulfilling the purpose as discussed above and may e.g. comprise cellulose fibers, non-woven or woven glass or polymer-based non-woven materials such as polypropylene felt materials or any other similar or equivalent material. However, the water-transport-allowing material is preferably a material allowing a transport of water through the material without accumulating an extreme amount of water within the material.

EXAMPLE 3

The hygroscopic paint may be manufactured from the following components:
binder 5–10%
clay 30–50%
water 40–55%

The binder may be constituted by a polyvinyl acetate, a polyester dispersion or a water dispersion of natural rubber. For adjustment of the content of solid material and obtaining tixotropic characteristics, additional components of preferably less than 2% at the most 5% of the paint may be included. All percentages by weight. The clay of the paint constitutes a capillary suction material, and the particle size of clay is $50\% \leq 1\mu$. Fungicides may additionally be included in the paint. The height of rise of water may amount to 0–500 mm, such as 50–250 mm. The paint is preferably applied as the layers 138, 140, and 142 as shown in FIGS. 16–19, in an amount of 50–1000 g/m$^2$, preferably 100–500 g/m$^2$.

EXAMPLE 4

A heat-insulating assembly was produced in accordance with the embodiment 310, described above with reference to FIGS. 23–26, from the following components: The annular heat-insulating body was made from rock wool fibers. The annular heat-insulating body comprising the segments 312 and 314 defined an overall length of 50 cm, an inner diameter of 5 cm, and an outer diameter 10 cm. The slits defining the surfaces 311 and 315, and the slit 313 were positioned diametrically opposite one another. The annular heat-insulating body was covered by an aluminium foil 316 of a thickness of 0.5 mm. The aluminium foil 316 defined a flap of a width of 4 cm. The strip 324 of water transport-allowing material was made from non-woven fleece material and had a width of 6 cm and a length of 37 cm.

Although the present invention has been described with reference to specific, at present preferred embodiments of alternative devices and techniques of removing condensed water from the outer surface of a body, such as a pipe, the surface temperature of which is at or below the dew point of the ambient air, numerous modifications and alternative embodiments are obvious to a person having ordinary skill in the art. The above detailed description is consequently by no means to be construed limiting the scope of the present invention as defined in the appending claims. Furthermore, the above embodiments and techniques are readily combinable in numerous alternatives. It is to be realized that in the above description of preferred and advantageous embodiments of the devices and techniques of removing condensed water from the outer surface of a body implemented by a pipe, the inner surface of the heat insulating covering is illustrated as an insulating covering arranged a small distance from the outer periphery of the pipe. Alternatively or preferably, the heat insulating covering is arranged in closer contact with the outer surface of the pipe so as to eliminate any space between the inner cylindrical surface of the heat insulating covering and the outer cylindrical surface of the pipe and further reduce the transport of water along the outer cylindrical surface of the pipe.

We claim:

1. A device for removing condensed water from a surface of a body having a surface temperature at or below the dew point of the ambient air, said surface being insulated relative to the ambient air by means of a heat-insulating assembly defining an outer surface and an assembly thickness, said device comprising:

a conduit means of a tubular configuration and defining an inner through-going passage, said conduit means having a length substantially equal to said assembly thickness, and said conduit means defining opposite first and second open ends, a plug means of a water-transport-allowing material, said plug means being received within said conduit means and constituting a filling of said inner through-going passage, said water-transport-allowing material being exposed at said first open end of said conduit means, a water evaporation means of a water-transport-allowing material, said evaporation means defining an exposed evaporation surface and being arranged at said second open end of said conduit means, and said evaporation means communicating with said plug means at said second open end of said conduit means so as to allow transfer of water from said plug means to said evaporation means, and a fastening means for fastening said conduit means relative to said insulating assembly in a position in which said conduit means extends through a through-going aperture of said insulating assembly, so as to position said first open end of said conduit means adjacent to said surface of said body, and so as to allow transfer of condensed water from said surface of said body to said water-transport-allowing material of said plug means being exposed at said first open end of said conduit means, and in which position said exposed evaporation surface of said evaporation means is positioned at said outer surface of said heat-insulating assembly and is exposed to the ambient air.

2. The device according to claim 1, said water-transport-allowing material of said plug means being a capillary suction material.

3. The device according to any of the claims 1, said water-transport-allowing material of said water evaporation means being a capillary suction material.

4. The device according to claim 1, said water-transport-allowing material of said plug means protruding from said first open end of said conduit means.

5. The device according to claim 1, said conduit means comprising a flange means at said second open end thereof, said flange means defining a support surface of supporting said evaporation means.

6. The device according to claim 5, said support surface being provided with an adhesive layer for adhering said evaporation means to said support surface of said flange means.

7. The device according to claim 6, said flange means defining a contact surface for establishing facial contact with said outer surface of said insulating assembly.

8. The device according to claim 7, said contact surface being provided with an adhesive layer for adhering said contact surface to said outer surface of said insulating assembly, said fastening means being constituted by said adhesive layer of said contact surface.

9. The device according to any of the claim 8, said flange means being of a curved configuration.

10. The device according to claim 9, said flange means constituting a cylindrical segment.

11. The device according to claim 10, said cylindrical segment defining an arch of the order of 40°–240°.

12. The device according to claim 7, said conduit means defining an outer conduit surface, said outer conduit surface being provided with outwardly protruding bards, said fastening means being constituted by said outwardly protruding bards.

13. The device according to claim 12, further comprising an adhesive strip for adhering to a part of said evaporation means and for adhering to said outer surface of said insulating assembly, said fastening means being constituted by said adhesive strip.

14. A heat-insulating assembly for insulating a surface of a body relative to the ambient air, said surface of said body having a surface temperature at or below the dew point of the ambient air, comprising:

a heat-insulating layer defining an outer surface and an assembly thickness, and a device for removing condensed water from said surface of said body, comprising:

a conduit means of a tubular configuration and defining an inner through-going passage, said conduit means having a length substantially equal to said assembly thickness, and said conduit means defining opposite first and second open ends, a plug means of a water-transport-allowing material, said plug means being received within said conduit means and constituting a filling of said inner through-going passage, said water-transport-allowing material being exposed at said first open end of said conduit means, a water evaporation means of a water-transport-allowing material, said evaporation means defining an exposed evaporation surface and being arranged at said second open end of said conduit means, and said evaporation means communicating with said plug means at said second open end of said conduit means so as to allow transfer of water from said plug means to said evaporation means, and said conduit means being received within a through-going aperture of said heat-insulating layer and fastened relative thereto in a position in which said first open end of said conduit means is positioned adjacent to said surface of said body, so as to allow transfer of condensed water from said surface of said body to said water-transport-allowing material of said plug means being exposed at said first open end of said conduit means, and in which position said exposed evaporation surface of said evaporation means is positioned at said outer surface of said heat-insulating layer and is exposed to the ambient air.

15. The heat-insulating assembly according to claim 14, said water-transport-allowing material of said plug means being a capillary suction material.

16. The heat-insulating assembly according to claim 14, said water-transport-allowing material of said water evaporation means being a capillary suction material.

17. The heat-insulating assembly according to claim 14, further comprising a vapor barrier layer arranged at said outer surface of said heat-insulating layer.

18. The heat-insulating assembly according to claim 14, said water-transport-allowing material of said plug means protruding from said first open end of said conduit means.

19. The heat-insulating assembly according to claim 14, said conduit means comprising a flange means at said second open end thereof, said flange means defining a support surface for supporting said evaporation means.

20. The heat-insulating assembly according to claim 19, said support surface being provided with an adhesive layer for adhering said evaporation means to said support surface of said flange means.

21. The heat-insulating assembly according to claim 20, said flange means being of a curved configuration.

22. The heat-insulating assembly according to claim 21, said flange means constituting a cylindrical segment.

23. The heat-insulating assembly according to claim 22, said circular, cylindrical segment defining an arch of the order of 40°–60°.

24. The heat-insulating assembly according to claim 14, said heat-insulating assembly comprising a plurality of devices for removing condensed water from said surface of said body.

25. The heat-insulating assembly according to claim 24, said heat-insulating layer defining an annular insulating body circumferentially encircling said body being a tubular body, said annular insulating body defining an inner cylindrical surface and an outer cylindrical surface, said inner cylindrical surface being arranged juxtaposed said surface of said tubular body, said plurality of devices comprising sets of devices being arranged circumferentially spaced apart at said outer cylindrical surface of said annular insulating body, and said sets being spaced apart longitudinally along said outer cylindrical surface of said annular insulating body.

26. A heat insulating assembly for insulating a surface of a tubular body relative to the ambient air, said surface of said tubular body having a surface temperature at or below the dew point of the ambient air, comprising:
- a heat-insulating layer defining an annular insulating body circumferentially encircling said tubular body, said annular insulating body defining an inner cylindrical surface and an outer cylindrical surface, said inner cylindrical surface being arranged juxtaposed said surface of said tubular body,
- a water-removal means of a water-transport-allowing material, said water-removal means being embedded within a through-going passage of said annular insulating body and being exposed at said inner cylindrical surface of said annular insulating body so as to allow transfer of condensed water from said surface of said tubular body to said water-transport-allowing material of said water-removal means, and
- a water evaporation means of a water-transport-allowing material, said evaporation means defining an exposed evaporation surface and being arranged at said outer cylindrical surface of said annular insulating body and communicating with said water-removal means so as to allow transfer of water from said water-removal means to said evaporation means, said exposed evaporation surface of said evaporation means being exposed to the ambient air.

27. The heat-insulating assembly according to claim 26, said water-transport-allowing material of said water-removal means being a capillary suction material.

28. The heat-insulating assembly according to claim 26, said water-transport-allowing material of said water evaporation means being a capillary suction material.

29. The heat-insulating assembly according to claim 26, further comprising a vapor barrier layer arranged at said outer cylindrical surface of said annular insulating body.

30. The heat-insulating assembly according to claim 26, said water-transport-allowing material of said water-removal means protruding from said inner cylindrical surface of said annular insulating body.

31. The heat-insulating assembly according to claim 26, said water-removal means being constituted by an annular disc of said water-transport-allowing material, said annular disc being embedded between two cylindrical segments of said annular insulating body, said cylindrical segments together defining said through-going passage.

32. The heat-insulating assembly according to claim 31, said evaporation means being constituted by an annular segment of said annular disc-shaped water-removal means protruding from said outer cylindrical surface of said annular insulating body.

33. The heat-insulating assembly according to claim 26, said water-removal means being constituted by a cord of said water-transport-allowing material, said cord being arranged circumferentially encircling said tubular body and being embedded between two cylindrical segments of said annular insulating body, said cylindrical segments together defining said through-going passage.

34. The heat-insulating assembly according to claim 33, said evaporation means being constituted by a foil of said water-transport-allowing material, said foil being arranged circumferentially encircling said outer cylindrical surface of said annular insulating body.

35. The heat-insulating assembly according to claim 26, said water-removal means being constituted by a layer of a hygroscopic paint applied to an annular end surface part of a cylindrical segment of said annular insulating body, said annular end surface part of said cylindrical segment together with an annular end surface part of an adjacent cylindrical segment of said annular insulating body defining said through-going passage.

36. The heat-insulating assembly according to claim 35, said evaporation means being constituted by a further layer of said hygroscopic paint applied to said outer cylindrical surface part of said annular insulating body.

37. The heat-insulating assembly according to claim 36, said layer of said hygroscopic paint applied to said annular end surface part of said cylindrical segment and said further layer of said hygroscopic paint constituting an integral layer of said hygroscopic paint.

38. The heat-insulating assembly according to claim 26, further comprising a perforated foil of a vapor barrier material applied to said water evaporation means and exposing said water evaporation means through perforations of said perforated foil.

39. A method of removing condensed water from a surface of a body having a surface temperature at or below the dew point of the ambient air, said surface being insulated relative to the ambient air by means of a heat-insulating assembly defining an inner surface arranged juxtaposed said surface of said body and an outer surface exposed to the ambient air, said method comprising:
- providing a through-going passage extending through said heat-insulating assembly defining first and second open ends at said inner and outer surfaces, respectively, of said heat-insulating assembly,
- arranging a plug means of a water-transport-allowing material within said through-going passage constituting a filling thereof, said water-transport-allowing material being exposed at said first open end of said through-going passage, so as to allow transfer of condensed water from said surface of said body to said water-transport-allowing material of said plug means, and
- arranging a water evaporation means of a water-transport-allowing material defining an exposed evaporation surface at said second open end of said through-going passage, so as to establish communication between said plug means and said evaporation means at said second open end of said through-going passage, and so as to allow transfer of water from said plug means to said evaporation means, said exposed evaporation surface of said water evaporation means being exposed to the ambient air for evaporating water to the ambient air.

40. The method of claim 39, said water-transport-allowing material of said plug means being a capillary suction material.

41. The method according to claim 39, said water-transport-allowing material of said water evaporation means being a capillary suction material.

42. The method according to claim 39, said water-transport-allowing material of said plug means being arranged protruding from said first open end of said through-going passage of said heat-insulating assembly, so as to establish surface contact with said surface of said body.

43. A method of removing condensed water from a surface of a tubular body having a surface temperature at or below the dew point of the ambient air, the surface of the tubular body being insulated relative to the ambient air by means of a heat-insulating assembly defining an annular insulating body circumferentially encircling the tubular body, the annular insulating body defining an inner cylindrical surface and an outer cylindrical surface, the inner cylindrical surface being arranged juxtaposed the surface of the tubular body, and the outer cylindrical surface being exposed to the ambient air, the method comprising:

providing a through-going circumferential slit extending through the insulating body from the outer cylindrical surface to the inner cylindrical surface, arranging an elongated and flexible water-transport means of a water-transport-allowing material within the circumferential slit encircling the surface of the tubular body and extending from the inner cylindrical surface of the annular insulating body to the outer cylindrical surface of the annular insulating body, so as to allow transfer of condensed water from the surface of the body to the water-transport-allowing material of the water-transport means, and arranging a water evaporation means of a water-transport-allowing material defining an exposed evaporation surface at the outer cylindrical surface of the annular insulating body, so as to establish communication between the water-transport means and the water evaporation means at the outer cylindrical surface of the annular insulating body, and so as to allow transfer of water from the water-transport means to the evaporation means, the exposed evaporation surface being exposed to the ambient air for evaporating water to the ambient air.

44. A method of removing condensed water from a surface of a tubular body having a surface temperature at or below the dew point of the ambient air, said surface of said tubular body being insulated relative to the ambient air by means of a heat-insulating assembly defining an annular insulating body circumferentially encircling said tubular body, said annular insulating body defining an inner cylindrical surface and an outer cylindrical surface, said inner cylindrical surface being arranged juxtaposed said surface of said tubular body, and said outer cylindrical surface being exposed to the ambient air, said method comprising:

providing a through-going circumferential slit extending through said insulating body from said outer cylindrical surface to said inner cylindrical surface, so as to divide said annular insulating body into two segments having juxtaposed end surface parts, applying a layer of a hygroscopic paint to at least one of said end surface parts of said segments, said layer constituting a water-transport means encircling said surface of said tubular body and extending from said inner cylindrical surface of said annular insulating body to said outer cylindrical surface of said annular insulating body, so as to allow transfer of condensed water from said surface of said body to said water-transport means, and applying a further layer of a hygroscopic paint to said outer cylindrical surface of said annular insulating body, said further layer constituting a water evaporation means defining an exposed evaporation surface at said outer cylindrical surface of said annular insulating body, so as to establish communication between said water-transport means and said water evaporation means at said outer cylindrical surface of said annular insulating body, and so as to allow transfer of water from said water-transport means to said evaporation means, said exposed evaporation surface being exposed to the ambient air for evaporating water to the ambient air.

45. A heat-insulating assembly for insulating a surface of a tubular body relative to the ambient air, comprising:

a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body, and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating surface to be exposed to the ambient air for the evaporation of water transferred from said surface of said tubular body to said flap of said strip through said strip of said water transport-allowing material.

46. The heat-insulating assembly according to claim 45, said water transport-allowing material of said strip being a capilary suction material.

47. The heat-insulating assembly according to any of the claims 45, said annular heat-insulating body comprising mineral fibers.

48. The heat-insulating assembly according to claim 45, further comprising a sealing means for sealing said through-going slit of said annular heat-insulating body.

49. The heat-insulating assembly according to claim 48, said sealing means being constituted by a length of a vapour-impermeable adhesive tape.

50. The heat-insulating assembly according to claim 48, said sealing means being constituted by a flap of said vapour-barrier layer extending along said through-going slit of said annular heat-insulating body and having an adhesive coating for adhering to said vapour-barrier layer in overlapping relationship therewith along said through-going slit of said annular heat-insulating body.

51. The heat-insulating assembly according to claim 45, further comprising a perforated foil of a vapour-barrier material to be applied to said vapour-barrier layer covering said outer cylindrical surface of said annular heat-insulating body so as to expose said flap of said strip of said water transport-allowing material through perforations of said perforated foil.

52. The heat-insulating assembly according to claim 45, said strip defining opposite first and second ends, said first end being adhered to said annular heat-insulating body at said through-going slit of said annular heat-insulating body, and said second end defining said flap of said strip for the evaporation of water transferred from said surface of said tubular body to said flap of said strip through said strip of said water transport-allowing material.

53. A method of insulating a surface of a tubular body relative to the ambient air and removing condensed water from said surface of said tubular body, comprising:

providing a heat-insulating assembly for insulating said surface of said tubular body, comprising:

a length of an annular heat-insulating body defining an inner cylindrical surface and an outer cylindrical surface, a vapour-barrier layer being applied to and covering said outer cylindrical surface of said annular heat-insulating body, and a through-going slit extending through said annular heat-insulating body in the entire length thereof so as to allow said annular heat-insulating body to be opened for positioning said annular heat-insulating body circumferentially encircling said tubular body so as to position said inner cylindrical surface juxtaposed said surface of said tubular body, and a strip of a water transport-allowing material defining a width substantially smaller than said length of said annular heat-insulating body and a length allowing said strip to be arranged within said annular heat-insulating body circumferentially encircling said tubular body and extending through said slit of said annular heat-insulating body for presenting an exposed flap of said strip at said outer cylindrical surface of said annular heat-insulating surface to be exposed to the ambient air for the evaporation of water transferred from said surface of said tubular body to said flap of said strip through said strip of said water transport-allowing material, and arranging said heat-insulating assembly circumferentially encircling said tubular body so as to arrange said strip of said water transport-allowing material circumferentially encircling said surface of said tubular body, and so as to expose said flap of said strip at said outer cylindrical surface covered by said vapour-barrier layer for allowing water transferred from said surface of said tubular body through said water transport-allowing material of said strip to said flap to be evaporated.

54. The method according to claim 53, further comprising applying a sealing means of a water-impermeable material along said slit for sealing said slit relative to the ambient air.

55. The method according to claim 54, said sealing means being applied as a length of a water-impermeable adhesive tape.

56. The method according to claim 54, said sealing means being provided by a flap of said vapour-barrier layer extending along said slit of said annular heat-insulating body, and said flap being applied along said slit by adhering said flap of said vapour-barrier layer to said vapour-barrier layer in overlapping relationship therewith along said through-going slit of said annular heat-insulating body by means of an adhesive coating applied to said flap of said vapour-barrier layer.

57. The method according to claim 53, further comprising applying a perforated foil of a vapour-barrier material to said vapour-barrier layer covering said outer cylindrical surface of said annular heat-insulating body, so as to expose said flap of said strip of said water transport-allowing material through perforations of said perforated foil.

58. The device according to claim 10, said arch being of the order of 40°–60°.

59. The device according to claim 10, said arch being approximately 60°.

60. The device according to claim 10, said arch being of the order of 180°–240°.

61. The device according to claim 10, said arch being approximately 200°–240°.

62. The heat-insulating assembly according to claim 23, said arch being approximately 60°.

63. The method according to claim 43, said water-transport-allowing material of said water-removal means being a capillary suction material.

64. The method according to claim 43, said water-transport-allowing material of said water evaporation means being a capillary suction material.

65. The method according to claim 43, a vapor barrier layer further being arranged at said outer cylindrical surface of said annular insulating body.

66. The method according to claim 43, said water-transport-allowing material of said water-removal means being arranged protruding from said inner cylindrical surface of said annular insulating body.

67. The method according to claim 43, said water-removal means being constituted by an annular disc of said water-transport-allowing material, said annular disc being embedded between two cylindrical segments of said annular insulating body, said cylindrical segments together defining said through-going passage.

68. The method according to claim 67, said evaporation means being constituted by an annular segment of said annular disc-shaped water-removal means protruding from said outer cylindrical surface of said annular insulating body.

69. The method according to claim 43, said water-removal means being constituted by a cord of said water-transport-allowing material, said cord being arranged circumferentially encircling said tubular body and being embedded between two cylindrical segments of said annular insulating body, said cylindrical segments together defining said through-going passage.

70. The method according to claim 69, said evaporation means being constituted by a foil of said water-transport-allowing material, said foil being arranged circumferentially encircling said outer cylindrical surface of said annular insulating body.

71. The method according to claim 44, said further layer being applied to one of said segments or both segments of said annular insulating body.

72. The method according to claim 44, said layer of said hygroscopic paint and said further layer of said hygroscopic paint being constituted by a single integral layer.

73. The method according to claim 44, a perforated vapor barrier foil further being arranged covering said further layer an exposing said water evaporation means through perforations of said perforated foil.

* * * * *

UNITED STATES PATENT AND TRADEMARK OFFICE
CERTIFICATE OF CORRECTION

PATENT NO. : 5,520,009

DATED : May 28, 1996

INVENTOR(S) : Jepsen et al.

It is certified that error appears in the above-identified patent and that said Letters Patent is hereby corrected as shown below:

```
Column 10, line 17, "of" should read --to--.

Column 13, line 52, "view" should read --views--. (1st occur.)

Column 14, line 48, "view" should read --views--. (2nd occur.)

Column 22, line 35, "is" should read --as--.

Column 22, line 47, "a" should read --the--.

Column 23, line 17, "paints" should read --paint--.

Column 29, line 32 (claim 3), "any of the claims" should read
--claim--.

Column 29, line 40 (claim 5), "of" should read --for--.

Column 36, line 10 (claim 61), "200°-240°" should read --
200°-220°--.

Column 34, line 38 (claim 46), "capilary" should read
--capillary--.
```

UNITED STATES PATENT AND TRADEMARK OFFICE
CERTIFICATE OF CORRECTION

PATENT NO. :  5,520,009

DATED :  May 28, 1996

INVENTOR(S) :  Jepsen et al.

It is certified that error appears in the above-identified patent and that said Letters Patent is hereby corrected as shown below:

Column 34, line 40 (claim 47), "any of the claims" should read --claim--.

Signed and Sealed this

Twenty-first Day of January, 1997

Attest:

BRUCE LEHMAN

Attesting Officer

Commissioner of Patents and Trademarks